US008320321B2

(12) United States Patent
Joshi et al.

(10) Patent No.: US 8,320,321 B2
(45) Date of Patent: Nov. 27, 2012

(54) OPTIMIZING POSITIONS OF TIME SLOTS IN A HYBRID TIME DIVISION MULTIPLE ACCESS (TDMA)-CARRIER SENSE MULTIPLE ACCESS (CSMA) MEDIUM ACCESS CONTROL (MAC) FOR MULTI-HOP AD HOC NETWORKS

(75) Inventors: Avinash Joshi, Lake Mary, FL (US); Manish Shukla, Altamonte Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1047 days.

(21) Appl. No.: 11/767,171

(22) Filed: Jun. 22, 2007

(65) Prior Publication Data
US 2008/0316966 A1 Dec. 25, 2008

(51) Int. Cl.
*H04W 4/00* (2009.01)
(52) U.S. Cl. ........ 370/330; 370/348; 370/347; 370/445; 370/346; 370/278; 370/458
(58) Field of Classification Search .................. 370/330, 370/348, 347, 445, 346, 278, 458
See application file for complete search history.

(56) References Cited

U.S. PATENT DOCUMENTS

| 6,996,088 | B1 | 2/2006 | Kroon et al. |
| 7,212,504 | B2 | 5/2007 | Belcea |
| 7,502,360 | B2 * | 3/2009 | Liu et al. ........................ 370/348 |
| 2004/0143842 | A1 | 7/2004 | Joshi |
| 2005/0238040 | A1 | 10/2005 | Vitebsky et al. |
| 2005/0243858 | A1 | 11/2005 | Vitebsky et al. |
| 2007/0025383 | A1 | 2/2007 | Katar et al. |
| 2007/0036089 | A1 | 2/2007 | Metke |
| 2007/1211686 | | 9/2007 | Belcea |
| 2007/0274272 | A1 | 11/2007 | Joshi |
| 2007/0274320 | A1 | 11/2007 | Joshi |
| 2008/0112371 | A1 | 5/2008 | Joshi |

OTHER PUBLICATIONS

PCT International Search Report Application No. PCT/US2008/067458 Dated Jan. 22, 2009—11 Pages.
Hybrid TDMA/CSMA Protocol for Self Managing Packet Radio Networks—Sharp, B.A. et al—Universal Personal Communications. 1995. Record.—1995 Fourth IEEE International Conference Nov. 1995—pp. 929-933.
Z-MAC: A Hybrid MAC for Wireless Sensor Networks—Injong Rhee et al—SenSys Nov. 2005 12pp.
A Framed, Movable-Boundary Protocol for Integrated Voice/Data in a LAN—Sharrock, S.M. et al—SIGCOMM Comput. Commun. Rev. 1986—pp. 111-119.
PCT/US2008/067458, Preliminary Report on Patentability, mailed Jan. 7, 2010, 8 pages.

\* cited by examiner

*Primary Examiner* — Charles Appiah
*Assistant Examiner* — Alexander Yi
(74) *Attorney, Agent, or Firm* — Randi L. Karpinia

(57) ABSTRACT

A hybrid TDMA-CSMA MAC protocol is provided for allocating time slots within a frame having a structure in which transmission time is divided into a first number of actual TDMA time slots and a second number of "virtual" CSMA time slots. Each time a given node receives a Hello message, it can calculate variables based on an HSN field. A ratio of the first number to the second number can be dynamically adjusted depending upon the traffic conditions. When TDMA time slots within the frame are freed (e.g., no longer being used), slot position optimization techniques are provided for moving these freed TDMA time slots back into the CSMA portion of the frame and reallocating or moving other TDMA time slots into the portion of the frame that was previously occupied by the freed TDMA time slots to thereby maximize resource utilization.

23 Claims, 20 Drawing Sheets

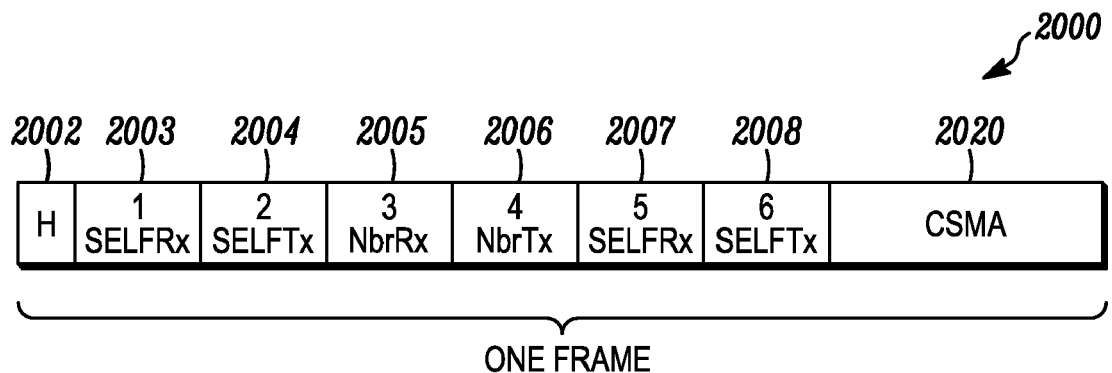
*FIG. 19*
| NODE | HIGHEST SLOT NUMBER | CSMA START TIME |
|---|---|---|
| A | 6(SELFTx) | 7 |
| B | 6(NbrTx) | 7 |
| C | 4(SELFRx) | 7 |
| D | 4(NbrRx) | 5 |
| E | 6(SELFRx) | 7 |
| F | 6(NbrRx) | 7 |
| G | 4(NbrRx) | 7 |
| H | 6(NbrRx) | 7 |
| I | 2(NbrRx) | 5 |
TABLE 1: HYBRID MAC VARIABLES ON EACH NODE
*FIG. 20*
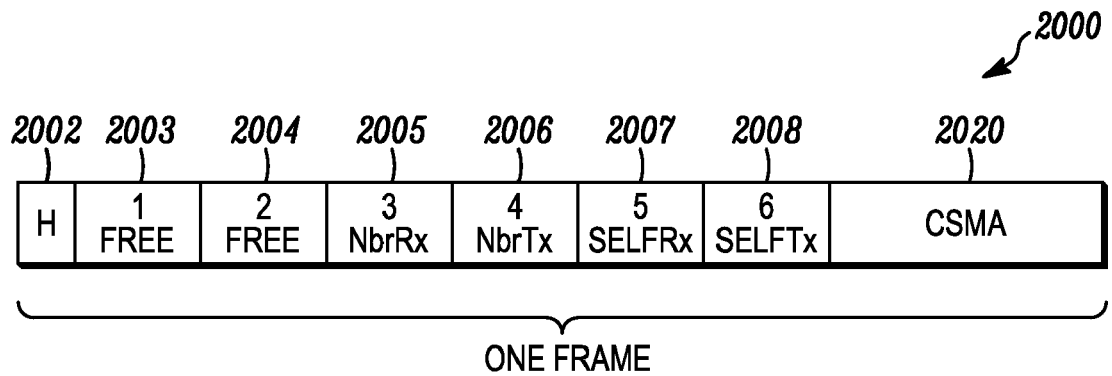
*FIG. 21*

OPTIMIZING POSITIONS OF TIME SLOTS IN A HYBRID TIME DIVISION MULTIPLE ACCESS (TDMA)-CARRIER SENSE MULTIPLE ACCESS (CSMA) MEDIUM ACCESS CONTROL (MAC) FOR MULTI-HOP AD HOC NETWORKS

FIELD OF THE INVENTION

The present invention relates generally to wireless communications and more particularly to hybrid Time Division Multiple Access (TDMA)-Carrier Sense Multiple Access (CSMA) Medium Access Control (MAC) protocols in multi-hop ad hoc networks.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through conversation with its neighboring nodes. The routing information can also be periodically broadcast in the network to reflect the current network topology. Alternatively, to reduce the amount of information transmitted for maintaining accurate routing information, the network nodes may exchange routing information only when it is needed. One approach for routing information, known as Mesh Scalable Routing (MSR), is described in United States Patent Application Publication Number 20040143842 entitled "System And Method For Achieving Continuous Connectivity To An Access Point Or Gateway In A Wireless Network Following An On-Demand Routing Protocol, And To Perform Smooth Handoff Of Mobile Terminals Between Fixed Terminals In The Network," filed Jan. 13, 2004, which is incorporated by reference herein in its entirety.

Carrier Sense Multiple Access (CSMA) is a probabilistic Media Access Control (MAC) protocol in which a node verifies the absence of other traffic before transmitting on a shared physical medium, such as an electrical bus, or a band of electromagnetic spectrum. "Carrier Sense" describes the fact that a transmitter node listens for carrier wave before trying to send. The transmitter node tries to detect the presence of an encoded signal from another node before attempting to transmit. If a carrier is sensed, the transmitter node waits for the transmission in progress to finish before initiating its own transmission. "Multiple Access" means that multiple nodes send and receive on the medium.

In a pure CSMA network, only the carrier sense is used to avoid collisions. Concurrent transmission by multiple nodes can result in frame collisions. For example, if two nodes try to send a frame concurrently (e.g., at nearly the same time), neither detects a carrier and therefore both begin transmitting. In this situation, the concurrent transmissions interfere with each other so that receiver nodes are unable to distinguish the overlapping received signals from each other. Receiver nodes cannot distinguish between collisions and other sources of frame errors, and therefore collision recovery relies on the ability of the communicating nodes to detect frame errors and invoke an error recovery procedure.

In CSMA networks it is generally not possible to entirely prevent collisions. CSMA variants developed to address collisions include, for example, Carrier Sense Multiple Access With Collision Avoidance (CSMA/CA), and Carrier Sense Multiple Access With Collision Detection (CSMA/CD).

In CSMA/CA, each node informs other nodes of its intent to transmit. When the other nodes have been notified, the information is transmitted. This arrangement prevents collision because all nodes are aware of a transmission before it occurs. However, collisions are still possible, and are not detected, so they have the same consequences as in pure CSMA.

In CSMA/CD, sending nodes are able to detect when a collision occurs and stop transmitting immediately, backing off for a random amount of time before attempting to transmit again. This results in much more efficient use of the media since the bandwidth for transmitting the entire frame is not wasted. However, it is not possible with all media (e.g., radio), and requires extra electronics.

CSMA MAC protocols work well with bursty, non-periodic traffic such as http, web surfing, and the like, but can incur significant delays for time sensitive, periodic traffic.

Time Division Multiple Access (TDMA) is a technology for shared medium networks. TDMA MAC protocols require time synchronization and slot reservation for collision free transmission. TDMA MAC protocols allow several users to share the same frequency by dividing it into different timeslots. The users transmit in rapid succession, one after the other, each using their assigned timeslot. This allows multiple users to share the same transmission medium (e.g., radio frequency) while using only the part of its bandwidth which they require.

TDMA MAC protocols are generally regarded as being efficient for periodic, delay sensitive traffic (e.g., voice traffic and video traffic), since they provide contention free transmission. On the other hand, as described previously herein, CSMA MAC protocols work well with bursty traffic (e.g., web surfing).

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

FIG. 19 is a data structure diagram illustrating one frame of a super frame data structure for node A according to the scenario illustrated in FIG. 20;

FIG. 20 is a table which illustrates values of hybrid MAC variables at each node A-I in the scenario illustrated in the communication network of FIG. 18;

FIG. 21 is a data structure diagram illustrating the structure of the frame at node A at another time according to a scenario when communication between node A and node D ends;

Figure 1:
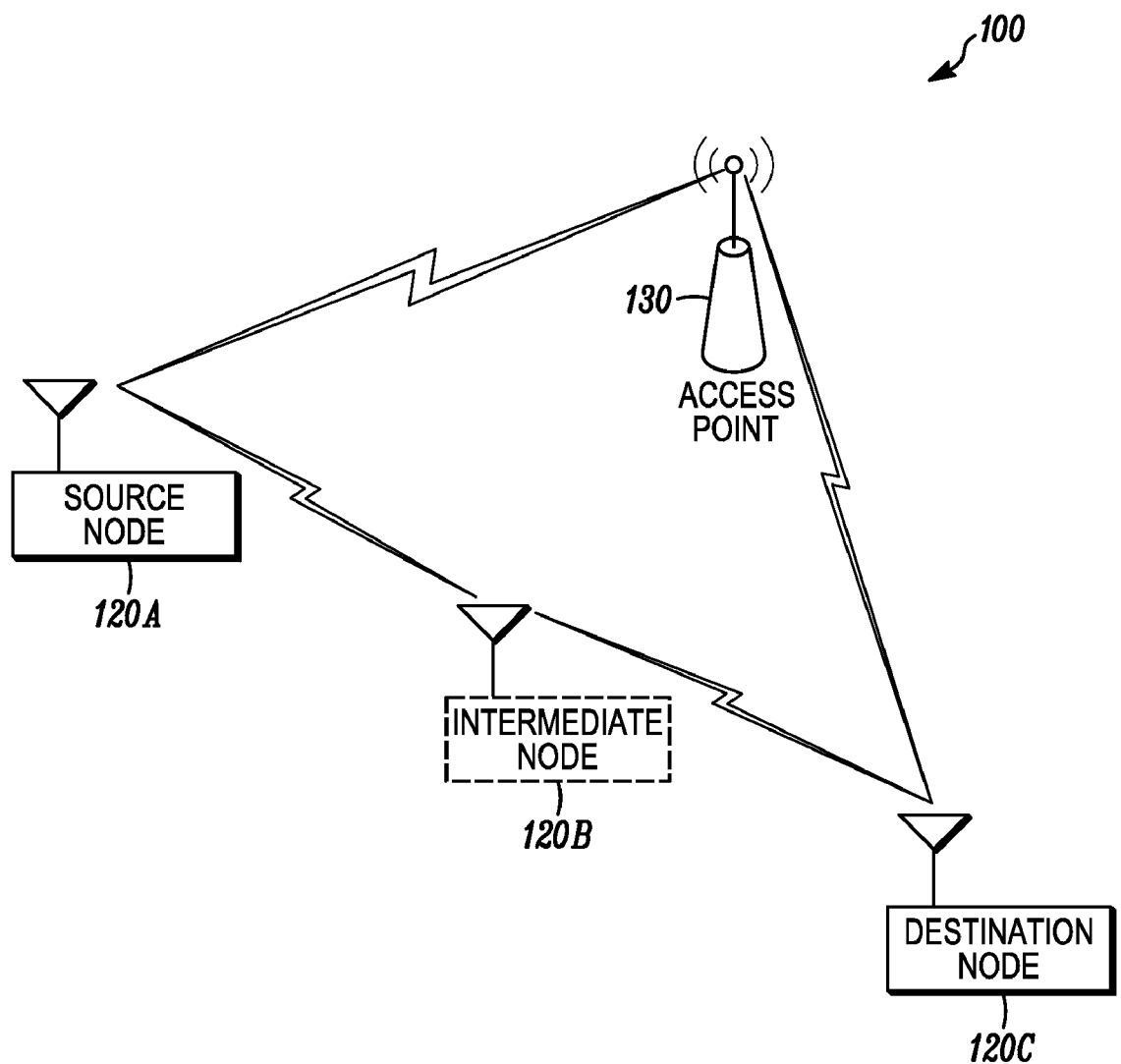
FIG. 1 is a block diagram of a communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to determining whether an arrangement of TDMA time slots in frame that is divided into a TDMA portion and a CSMA portion can be optimized even when the relative percentages of the frame which are allocated for the TDMA portion and the CSMA portion dynamically adjust based on the traffic pattern. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for determining whether an arrangement of TDMA time slots in frame that is divided into a TDMA portion and a CSMA portion can be optimized even when the relative percentages of the frame which are allocated for the TDMA portion and the CSMA portion dynamically adjust based on the traffic pattern, as described herein. The non-processor circuits may include, but are not limited to, a radio receiver, a radio transmitter, signal drivers, clock circuits, power source circuits, and user input devices. As such, these functions may be interpreted as steps of a method for determining whether an arrangement of TDMA time slots in frame that is divided into a TDMA portion and a CSMA portion can be optimized even when the relative percentages of the frame which are allocated for the TDMA portion and the CSMA portion dynamically adjust based on the traffic pattern. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

Any embodiment described herein is not necessarily to be construed as preferred or advantageous over other embodiments. All of the embodiments described in this Detailed Description are illustrative provided to enable persons skilled in the art to make or use the invention and not to limit the scope of the invention which is defined by the claims.

Ad Hoc Multi-Hopping Network

FIG. 1 is a block diagram of an ad hoc communication network 100 comprises a number of existing nodes 120 A-C. It will be appreciated by those of ordinary skill in the art that although three nodes are illustrated in FIG. 1, any number of nodes can be implemented within the network 100 in accordance with the present invention.

The nodes 120A-120C can support simultaneous operation in both infrastructureless mode and infrastructured mode and can move seamlessly between infrastructure-based networks (those including for example an Access Point AP 130) and client-based peer-to-peer networks which are free of any infrastructure.

The ad hoc multi-hopping communication network 100 can be created between a plurality of nodes 120A-120C each having wireless repeater and/or routing capability, and optionally a wired Access Point (AP) 130. Clients can move seamlessly between infrastructure-based networks and client-based peer-to-peer networks. It will be appreciated by those of ordinary skill in the art that while the ad hoc network 100 in FIG. 1 is shown as operating in an infrastructured mode (e.g., including APs and/or cellular base stations), the ad hoc network 100 of FIG. 1 does not require any network infrastructure to be present.

In the ad hoc multi-hopping network 100, communications to and/or from nodes 120A-120C can "hop" through each other to reach other nodes 120A-120C in the network. The nodes 120A-120C can generally be wireless devices designed to allow receiving of packetized audio, video and/or data information. Some of the components in a node, such as a processor, transmitter, receiver and antenna, are described herein below in association with FIG. 2. The nodes 120A-120C can exchange information as data packets transmitted over carrier frequencies, each of which includes one or more wireless communication channels.

In infrastructure mode, the access point AP 130 is coupled to a wired network (not shown) and can provide one or more sources of audio, video and/or data information. The access point AP 130 may be, for example, a cellular base station or other wireless access point.

Although not shown in FIG. 1, it will be appreciated by those of ordinary skill in the art that the nodes 120A-120C, can also communicate information packets with a cellular-based network (not shown) over wireless communication medium, each of which includes one or more wireless communication channels depending on the multiple access scheme utilized in the cellular-based network.

Figure 2:
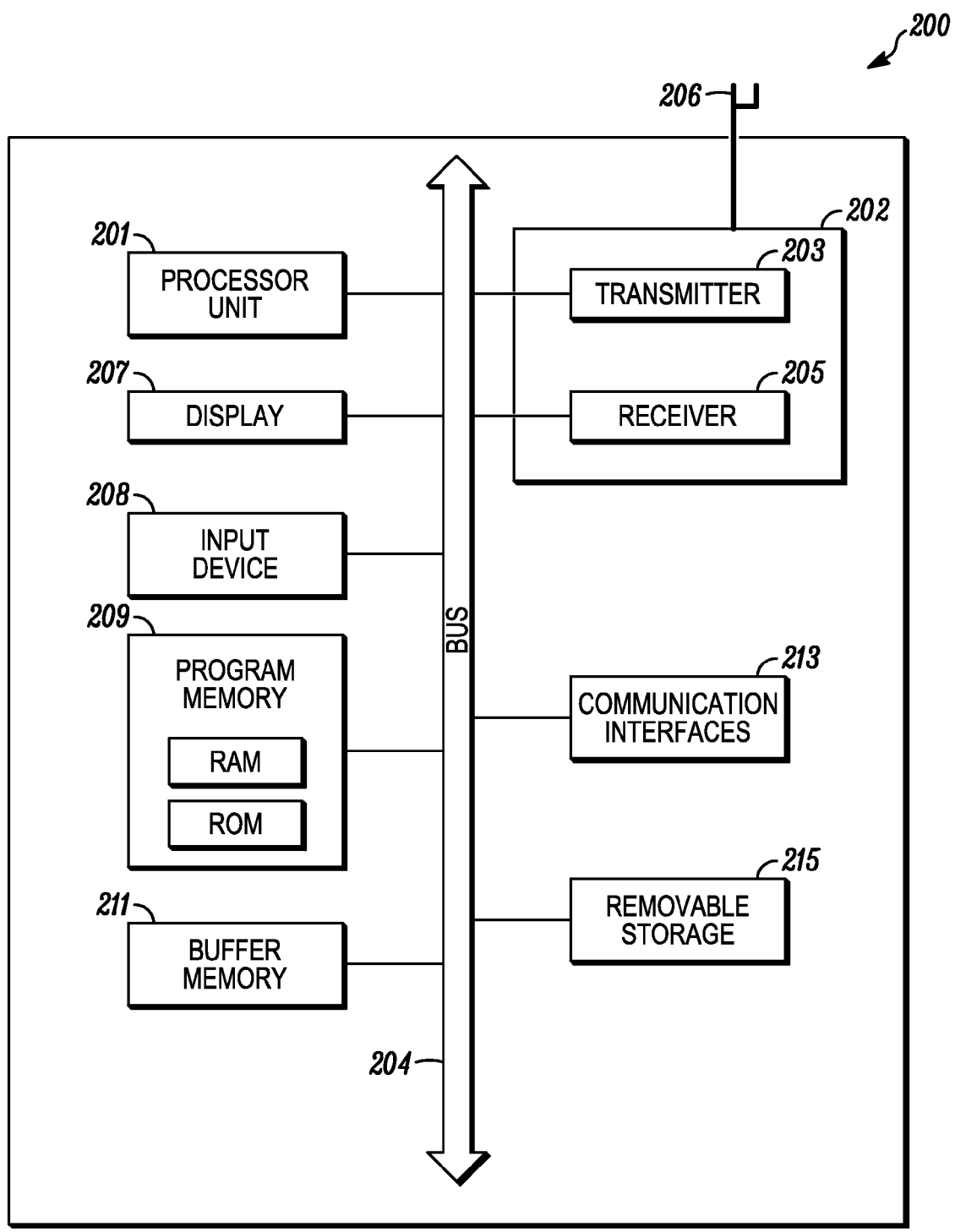
FIG. 2 is a block diagram of a node for use in the operation of some embodiments of the invention.

FIG. 2 is a block diagram of a node 200. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the node 200 can also include an antenna switch, duplexer, circulator, or other highly isolative means (not shown) for intermittently providing information packets from the transmitter circuitry 203 to the antenna 206 and from the antenna 206 to the receiver circuitry 205. The node 200, for example, can be an integrated unit containing at least all the elements depicted in FIG. 2, as well as any other elements necessary for the node 200 to perform its particular functions. Alternatively, the node 200 can comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 includes one or more microprocessors, microcontrollers, DSPs (digital signal processors), state machines, logic circuitry, or any other device or devices that process information based on operational or programming instructions. Such operational or programming instructions are can be stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax (Worldwide Interoperability for Microwave Access), and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of radio frequency (RF) signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within two or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the node 200 is constructed to receive video information from a video source, the node 200 may further include a video decoder designed to allow decoding the current Moving Picture Experts Group (MPEG) standard or some other video decoding standard. When the node 200 is further designed to allow transmitting video information, the node 200 includes a video encoder designed to allow encoding the video data into at least one of the foregoing video standards. Such video encoder and decoder can be implemented as part of the processor 201.

Overview

Real world communication traffic within a network is a dynamic mixture of voice traffic, video traffic, web traffic, and the like, where the traffic profile usage changes dynamically. One method of achieving higher efficiency for real world traffic is to define a frame structure in which the transmission time is divided into TDMA and CSMA portions. The specific divisions allocated for each portion are typically based on intended usage model (e.g., fifty-percent (50%) voice/fifty-percent (50%) data). However, since the usage profiles can change dynamically there is a possibility of inefficiency if the usage is different from what was estimated (e.g., ten-percent (10%) voice/ninety-percent (90%) data or ninety-percent (90%) voice/ten-percent (10%) data).

The present invention provides techniques and technologies for providing a frame structure in which the time slots of a particular frame (e.g., transmission time) are divided into a TDMA portion and a CSMA portion. The present invention further provides techniques and technologies in which the relative percentages of the frame which are allocated for the TDMA portion and the CSMA portion can be dynamically adjusted depending upon the traffic pattern.

Techniques and technologies are provided herein for allocating time slots within a frame transmitted/received in a multi-hop ad hoc network comprising a plurality of nodes. As used herein, the term "multi-hop ad hoc network" refers to any type of wireless network which employs routing protocols among nodes which are part of a network.

A hybrid TDMA-CSMA MAC protocol is provided for multi-hop ad hoc networks. Nodes implement a hybrid MAC protocol in which TDMA and CSMA protocols are used in a hybrid fashion to allow maximum utilization of network resources. The "hybrid MAC" combines the best features of CSMA and TDMA while offsetting their weaknesses and solves the problems faced in pure CSMA or TDMA systems. The hybrid MAC works well for both bursty traffic and for real-time, delay sensitive traffic, and allows for maximum network resource utilization. The relative percentages of the frame which are allocated for the TDMA portion and the CSMA portion can be dynamically adjusted depending upon the traffic pattern observed at any particular time. The relative percentages can be expressed as a "ratio" (e.g., number of actual time slots in a frame which are allocated for a TDMA portion of the frame versus a number of "virtual" time slots in the frame which are allocated for a CSMA portion of the frame). This ratio allows a "virtual adjustable boundary" to be defined between a TDMA portion of a frame and a CSMA portion of the frame which can be dynamically adjusted at each node based on certain variables (some of which are optional) calculated at each node which reflect the observed traffic pattern at any particular time.

In one non-limiting implementation, for example, a frame comprises a first number of actual TDMA time slots for a Time Division Multiple Access (TDMA) portion of the frame comprising at least a Hello time slot at the zero$^{th}$ time slot; and a Carrier Sense Multiple Access (CSMA) portion of the frame comprising a second number of "virtual" time slots. The ratio of the first number to the second number can be adjusted based on a traffic conditions which are observed by nodes within the multi-hop ad hoc network.

Once Hello time slots have been allocated to each of the nodes in a multi-hop ad hoc network, when a particular node seeks to transmit within the network, the particular node can determine a particular number of time slots needed to support a particular transmission based, for example, on traffic conditions observed by the particular node and/or quality of service (QoS) requirements for the particular transmission.

Each of the nodes can transmit a Hello message in its assigned Hello time slot which comprises at least the following information: (a) time slots being used by a node to receive and transmit; (b) time slots being used by neighbor nodes of the node to receive and transmit; and (c) a Highest Slot Number (HSN) field which indicates a highest slot number being used by the node or being used by a neighbor node of the node. It will be appreciated that other information can also be transmitted within assigned Hello time slot(s).

At a given node, each time one of the Hello messages is received from a neighbor node, the given node can calculate variables based on the HSN field, and these variables can then be used by the given node to dynamically adjust the boundary between TDMA and CSMA portion of the frame.

According to some embodiments of the present invention, to intelligently merge the unused TDMA time slots in CSMA portion of the frame and thereby improve frame utilization, a node can determine, based on the current arrangement of TDMA time slots in the frame, whether the arrangement of TDMA time slots can be optimized by moving at least one active TDMA time slot into an unused TDMA time slot. When the node determines that the unused TDMA time slots can be moved back into the CSMA portion of the frame, the node implements techniques for relocating or moving other TDMA time slots into the portion of the frame that was previously occupied by the freed TDMA time slots.

Frames and Super Frames

Figure 3:
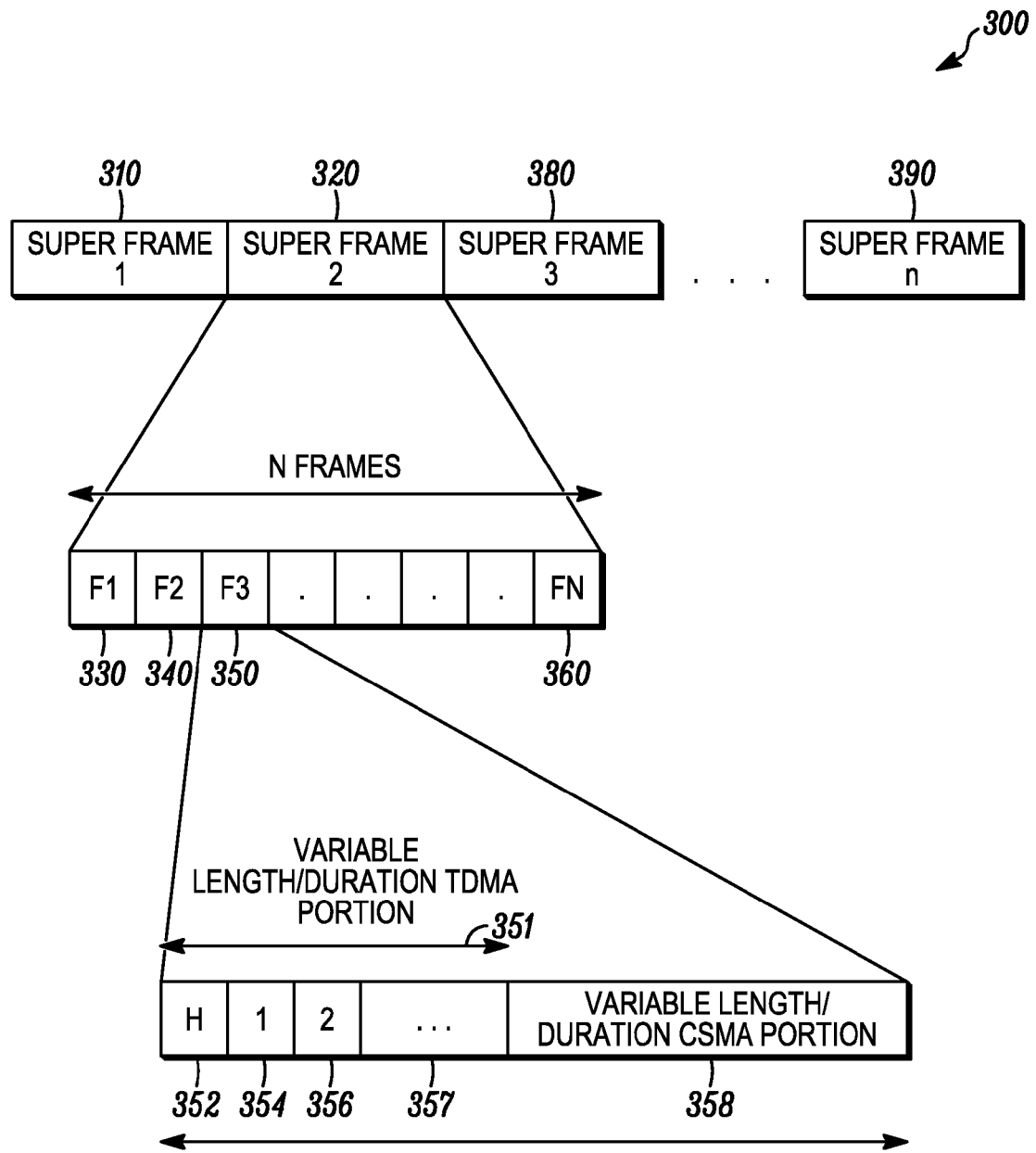
FIG. 3 is a data structure diagram illustrating a super frame data structure according to at least some embodiments of the invention.

FIG. 3 is a data structure diagram showing a super frame data structure 300 according to at least some embodiments of the invention. After initializing, all the nodes adhere to the framing structure shown in FIG. 3.

The super frame data structure 300 comprises a plurality of super frames (Super Frame 1 . . . Super Frame n) 310, 320, 380 . . . 390. Each super frame comprises a number of frames. For example, super frame 320 comprises frames (F1 . . . FN) 330-360.

Each frame (F1 . . . FN) 330-360 comprises a variable length/duration Time Division Multiple Access (TDMA) portion and a variable length/duration Carrier Sense Multiple Access (CSMA) portion of the frame. For example, frame 350 comprises a variable length/duration TDMA portion 351 of the frame 350 and a variable length/duration CSMA portion 358 of the frame 350. The TDMA portion 351 of the frame 350 comprises a "first number" of actual time slots including at least one a Hello time slot (H) at the zero$^{th}$ time slot 352. In some implementations, for example to accommodate large number of neighbors, more than one Hello time slot (H) can be provided in the TDMA portion 351 of the frame 350 (e.g., may have multiple Hello time slots in the beginning of the TDMA portion 351 of the frame 350). Nodes transmit one hello message 352 per super-frame and receive hello messages transmitted by other nodes. The first number is a variable number that changes depending on observed traffic conditions. The first number of the time slots of the TDMA portion 351 of the frame 350 are used to carry/transmit time-sensitive, periodic traffic, such as voice/video traffic. In one implementation, for example, each time slot in the frame 350 is long enough to accommodate/carry at least one voice over internet protocol (VoIP) packet.

The remainder 358 of the frame 350 is available for contention. The length of the CSMA portion 358 of the frame 350 is defined in terms of a second number of "virtual" time slots. The CSMA portion 358 of the frame 350 is defined in terms of "virtual" time slots because the entire frame 350 structure is divided into time slots, but the time slots in the CSMA portion 358 form continuous portion of frame 350 and are not considered as individual time slots. In other words, the CSMA portion 358 of the frame is a continuous portion of frame 350. The second number of virtual time slots of the CSMA portion 358 of the frame 350 can be used to carry/transmit non-periodic or "bursty" traffic. If a node is sending a packet at the boundary of the frame 350, the node makes sure that it can complete the transmission in the remaining time of the frame 350. The concept of "virtual" time slots is useful since all the nodes know the slot boundaries and numbering if more time slots are later added in TDMA portion of the frame 350 thereby changing the contention period (e.g., CSMA portion 358).

If the transmission of a packet cannot be completed in the CSMA portion 358 of the frame 350, the node can either fragment the packet and send the rest of the packet in next CSMA period or buffer the entire packet for transmission over next CSMA period.

Figure 4:
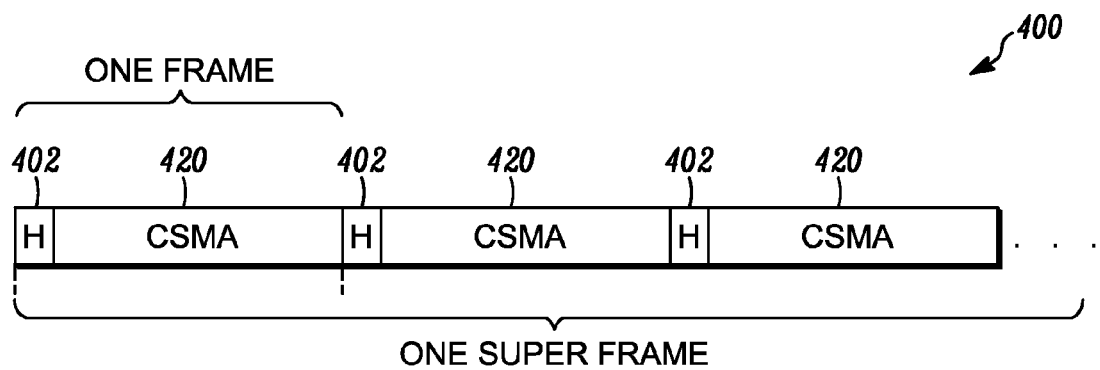
FIG. 4 is a data structure diagram illustrating an initial super frame data structure before TDMA time slots have been allocated according to at least some embodiments of the invention.

FIG. 4 is a data structure diagram 400 showing an initial super frame data structure 400 before TDMA time slots have been allocated according to at least some embodiments of the invention. In the initial state, no TDMA time slots have yet been allocated for a TDMA portion of the frame, and each frame has one slot (H) 402 which is used by nodes to transmit hello messages (H). The rest 420 of the frame is available for contention. All the nodes in the network choose a non-conflicting Hello Slot (H) 402 as per a Hello Slot Allocation Protocol, and adhere to frame boundaries using techniques such as those described in United States Patent Publication Number 20071211686A1, published Sep. 13, 2007, and entitled "System, Method And Apparatus For Reliable Exchange Of Information Between Nodes Of A Multi-Hop Wireless Communication Network," which is incorporated by reference herein in its entirety.

Alternatively, FIG. 4 can represent a data structure diagram 400 showing the super frame data structure 400 when no additional TDMA time slots have been allocated according to at least some embodiments of the invention. For example, if time-sensitive or periodic traffic, such as voice/video traffic, is not being transmitted (e.g., there is no time-sensitive or periodic traffic to be transmitted), then the "first number" of actual time slots in the TDMA portion of the frame is one (e.g., TDMA portion of the frame consists of only the zero$^{th}$ Hello time slot (H) 402) and no additional actual time slots are allocated to the TDMA portion of the frame. The remainder 420 of the frame (e.g., everything except for the Hello time slot) is used for contention based access (CSMA) and comprises the CSMA portion 420 of the frame (e.g., the second number of "virtual" time slots comprise the remainder of the frame). In other words, nodes use CSMA in the rest of the frame 420 (after the Hello time slot (H) 402 which includes the Hello message). Also, while time slot reservation for TDMA portion is happening, periodic traffic can be sent over CSMA (no wait while slot allocation).

Figure 5:
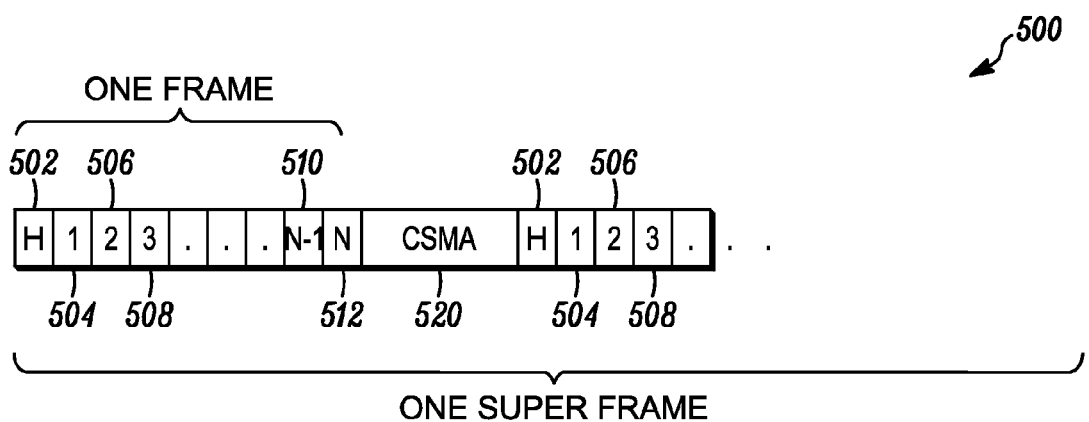
FIG. 5 is a data structure diagram illustrating a super frame data structure when a maximum number of TDMA time slots have been allocated according to at least some embodiments of the invention.

FIG. 5 is a data structure diagram showing a super frame data structure 500 when a maximum number of actual TDMA time slots 502-512 (H . . . N) have been allocated according to at least some embodiments of the invention. There is an upper limit (N) on the first number of actual time slots that can be allocated at a time in a frame for contention-free access (TDMA). When all actual time slots (H . . . N) are allocated, both a TDMA portion 502-512 of the frame and a CSMA portion 520 of the frame 350 are present. This helps ensure that bursty traffic (and control traffic) does not starve and always have enough CSMA portion 520 left for its transmission. For example, the first number of the time slots 502-512 of the TDMA portion of the frame is limited to a first predetermined number (N), and, when the first number is the first predetermined number (N), the second number of virtual time slots in the CSMA portion 520 comprise the remainder of frame.

For purposes of illustrating how this concept can be implemented in one implementation it is assumed that one frame includes space for a combination of a total of fifty (50) time slots and virtual time slots (including at least one Hello time slot at the zero$^{th}$ time slot 502). Moreover, it is assumed that, the maximum number of actual TDMA time slots 502-512 (including the zero$^{th}$ Hello time slot (H) 502) is 30 (e.g., N=29). However, it will be appreciated that in practical implementations, the total number of time slots and virtual time slots in a frame can vary depending upon the specific implementation, and further that the maximum number of actual TDMA time slots can comprise any other appropriate number. In one implementation, one frame includes space for any combination of fifty (50) total time slots and virtual time slots (e.g., each super frame has a length or duration of 1 second, and is divided into frames which have a length or duration of 20 milliseconds). The fifty total time slots comprise a "zero$^{th}$" time slot through a forty-ninth time slot. At least the zero$^{th}$ slot (e.g., slot zero) in each frame can be used as a Hello time slot (H) for carrying a Hello message. When there is time-sensitive or periodic traffic (e.g., voice/video traffic), the first number of the time slots of the TDMA portion of the frame is between at least one (1) and thirty (N=29), and the second number of virtual time slots of the CSMA portion of the frame is between thirty-one (N=30) and fifty (N=49).

Figure 6:
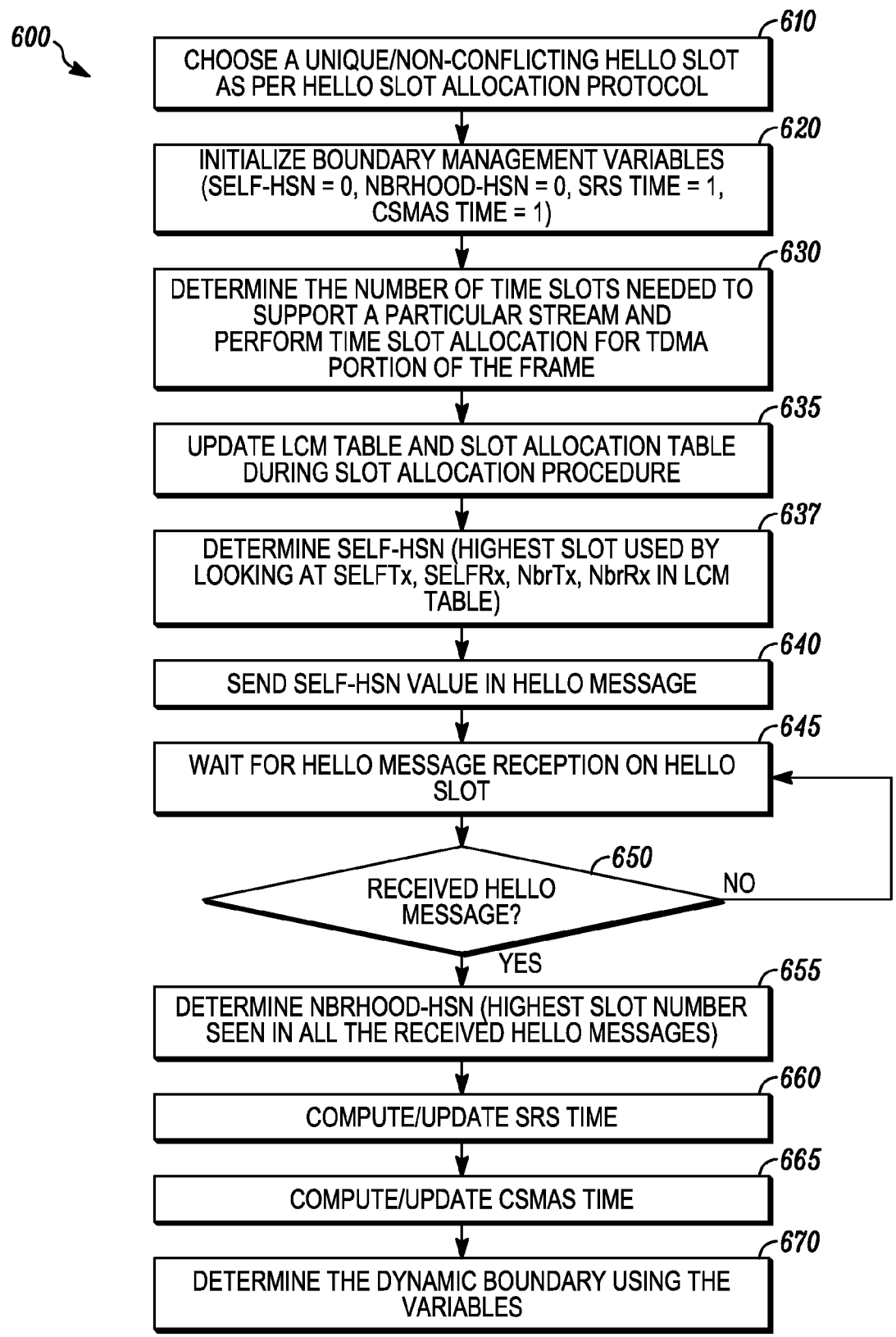
FIG. 6 is a flowchart illustrating techniques for determining and distributing dynamic boundary information and then using the dynamic boundary information to update dynamic boundary management variables according to at least some embodiments of the invention.

FIG. 6 is a flowchart illustrating techniques 600 for determining and distributing dynamic boundary information in a neighborhood and then using this information to update dynamic boundary management variables according to at least some embodiments of the invention. These techniques 600 can be used for dynamically adjusting a number of time slots in a frame which are allocated for a TDMA portion 351 of the frame 350 and a CSMA portion 358 of the frame 350 based upon an observed traffic pattern. These techniques 600 can be used by nodes in a multi-hop ad hoc network to allocate a plurality of time slots of a frame by adjusting a virtual boundary between the TDMA portion 351 of the frame 350 and the CSMA portion 358 of the frame 350 based on a traffic conditions in the multi-hop ad hoc network. This virtual boundary can be defined by a ratio of a first number of actual time slots in the TDMA portion 351 of the frame 350 to the second number of virtual time slots of the CSMA portion 358 of the frame 350.

The process 600 starts at step 610, when each node chooses a non-conflicting Hello time slot within a super frame as per a Hello Slot Allocation Protocol. A particular node can choose and be allocated an appropriate Hello time slot in the super frame so that their transmissions can be received by all the neighbor nodes without interference.

Any known techniques can be used to allocate Hello time slots to nodes, such as those described in the above referenced United States Patent Publication Number 20071211686A1, published Sep. 13, 2007, and entitled "System, Method And Apparatus For Reliable Exchange Of Information Between Nodes Of A Multi-Hop Wireless Communication Network" which is incorporated by reference herein in its entirety. According to these techniques, when a new node enters the ad hoc network, it selects a particular Hello slot timeslot in a dedicated channel and determines, via a contention channel, if the particular Hello slot is being used by any of the neighboring nodes within two hops. Network management information broadcast by the neighbor nodes associated with the new node on the dedicated channel is used for making Hello slot assignment or allocation decisions. If a particular Hello slot is identified as available (e.g., unused by any direct neighbor node or by neighbors of any of the direct neighbor nodes), then the new node selects it for reliably broadcasting information (i.e. Hello message).

Each particular Hello time slot can then be used by the particular node it has been allocated to when that particular node transmits Hello messages. Each node periodically or regularly sends a Hello message reliably in this dedicated Hello slot. Any other method can also be used to send periodic broadcast message exchange between the nodes.

At step 620, when the node has chosen and successfully found a Hello time slot, the node initializes boundary management variables by setting its self-HSN equal to zero, setting its neighborhood-HSN (nbrhood-HSN) equal to zero, setting its selective reply start (SRS) time equal to one, and setting its CSMA start (CSMAS) time equal to one. These variables will be described in detail below.

In general, a node can send out its latest (e.g., default or otherwise) highest slot number (HSN) information in this periodic message. Initially, the node sends Hello messages with the value of an HSN field set to a default value of zero (since no time slots are allocated yet in the TDMA portion 351 of the frame 350). Whenever TDMA time slots are allocated for a stream, the node transmits an updated HSN value in the Hello message. Upon reception of the Hello message, each node uses the HSN value specified in that Hello message to perform variable computation and to update their boundary variables (be it zero or another number).

The dynamic allocation of TDMA time slots starts when a node wants to transmit periodic data traffic, such as voice or video. For example, once the node determines that it has a voice call (e.g., by sniffing Session Initiation Protocol (SIP) packets or by other suitable means such as by using packet analyzers), the node initiates the process of finding a route to the destination. The routing function can be performed by any routing protocol such as one that can maintain multiple routes to the destination so that second path can be tried if slots are not available on the first one. Once the node has determined a route to the destination, the node starts the process of allocating slots along the route.

At step 630, a particular node can determine a particular number of time slots needed to support a particular transmission (e.g., based on traffic conditions observed by the particular node and QoS requirements for the particular transmission) and perform time slot allocation for the TDMA portion 351 of the frame 350. In one implementation, the number of time slots the particular node requires to support the particular transmission by the particular node can be determined and allocated using techniques such as those described in United States Patent Publication Numbers 20070274320A1 and 20070274272A1, filed May 25, 2006 published Nov. 29, 2007, and titled "Systems, Methods And Apparatus For Allocating Time Slots In An Ad Hoc Wireless Communication Network," and "Systems, Methods And Apparatus For Detecting Time Slot Interference And Recovering From Time Slot Interference In An Ad Hoc Wireless Communication Network," respectively, which are each incorporated by reference herein in its entirety.

Message exchanged during a time slot allocation process according to at least some embodiments of the invention will be described below with respect to FIG. 7. After time slot allocation, a node knows its current HSN (or self-HSN) and sends that information in Hello message. The default value of the self-HSN is zero.

Each node maintains Local Communication Map (LCM table) and Slot Allocation table to keep track of time slot status. The LCM table keeps the status of each time slot (i.e. whether it is used by this node or one of its neighbors). The Slot Allocation Table holds the mapping of stream numbers (uniquely identifying communication between a pair of source-destination) to the time slots. The various values stored in an LCM table are described, for example, in United States Patent Publication Nos. 20070274320A1 and 20070274272A1, published Nov. 29, 2007, and titled "Systems, Methods And Apparatus For Allocating Time Slots In An Ad Hoc Wireless Communication Network," and "Systems, Methods And Apparatus For Detecting Time Slot Interference And Recovering From Time Slot Interference In An Ad Hoc Wireless Communication Network," respectively. At step 635, the node updates its LCM table and Slot Allocation table during the slot allocation procedure.

At step 637, the node determines its self-HSN, which corresponds to the highest slot number being used by the node or its neighbors. For example, in one implementation, the node can determine its self-HSN by examining its LCM table to determine the time slots on which the node itself is transmitting (SelfTx) and receiving (SelfRx), and by examining the time slots on which the node's neighbors are transmitting (NbrTx) and receiving (NbrRx). As will be described below, the self-HSN is sent by a node in its Hello message and can be used for calculating a selective reply start (SRS) time.

At step 640, each of the nodes can transmit a Hello message in its assigned Hello time slot (H) which includes that node's self-HSN value (e.g., the HSN value that is calculated locally by the node by looking at its SelfTx, SelfRx, NbrTx, and/or NbrRx). In some embodiments, each node can transmit this Hello message on a regular basis (e.g., periodically or according to some other transmission schedule). In one implementation, this Hello message comprises information including (a) time slots being used by a node to receive and transmit; (b) time slots being used by neighbor nodes of the node to receive and transmit; and (c) a self-Highest Slot Number (HSN) field which indicates a highest slot number being used by the node itself or being used by neighbor nodes of the node (e.g., in its neighborhood). The highest slot number is the maximum slot number being used by node itself (e.g., SelfTx or SelfRx in an LCM table) or in its neighborhood (NbrTx, NbrRx in an LCM table). As will be described below, this information can be used by the neighbor nodes to calculate (and re-calculate) virtual boundary information which indicates where the virtual boundary is present between the TDMA portion of the frame and the CSMA portion of the frame.

At step 645, each node waits for reception of a Hello message on a Hello time slot, and at step 650, each node determines whether it has received a Hello message transmitted from its neighbor node(s).

Steps 645 and 650 repeat until a Hello message is received, at which point the process 600 proceeds to step 655, where each node can determine a neighborhood-Highest Slot Number (HSN) (or nbrhood-HSN) based on information received in Hello messages received from its neighbors. The neighborhood-HSN is calculated by finding the maximum of all of the HSN values received in Hello messages from its neighbors and its self-HSN value. For instance, in one implementation of step 655, each node determines the neighborhood-HSN by finding the highest HSN value seen in all the Hello messages and then comparing it with the self-HSN value. Each node picks the maximum of the two values as neighborhood-HSN. As will be described below, the neighborhood-HSN can be used to calculate a CSMA start (CSMAS) time which will comprise the sum of one and the neighborhood-highest slot number.

At step 660, each node can use the self-HSN to determine (e.g., calculate or compute) a selective reply start (SRS) time. This calculation can be performed by each node each time one of the Hello messages is received. The SRS time indicates a first time during which a particular node can start transmitting a response message (e.g. acknowledgement message (ACK) or Clear to Send (CTS) message) in a CSMA portion of the frame in response to a received packet, but not start a new CSMA transmission from the particular node. As shown in equation (1) below, the value of the SRS time comprises the sum of equation one (1) and the self-HSN as calculated by this node. (e.g., 1+self-Highest Slot Number (HSN)). As such, the default value of the SRS time is one (1) (e.g., when there are no actual time slots being used or allocated in the TDMA portion of the frame by this node or its neighbor nodes the self-HSN is zero (0)).

equation (1)

$$SRS\ Time = 1 + \max(SelfTx, SelfRx, NbrTx, NbrRx)$$

At step 670, each node can use the neighborhood-HSN to determine (e.g., calculate or compute) a CSMA start (CSMAS) time. This calculation can be performed by each node each time one of the Hello messages is received. The CSMAS time is a variable which indicates a second time during which the particular node can start a new contention based channel access (e.g., CSMA) transmission from the particular node on the CSMA portion of the frame. The CSMAS time variable is regularly updated by the node after receiving different Hello messages from its neighbors. The CSMAS time variable regularly updates with the highest of all the values in "Highest Slot Number" field heard from neighbor Hello messages and its self-HSN. As shown in equation (2) below, the value of the CSMAS time comprises the sum of one (1) and the neighborhood-HSN value (e.g., the value of the CSMAS time is: 1+the highest of all HSN values heard in Hello messages from its neighbor nodes and self-HSN).

Equation (2)

$$CSMAS\ Time = 1 + \max(\text{highest received } HSN \text{ in Hello}, self\text{-}HSN)$$

In other words, the largest or "neighborhood"-HSN value is determined from the self-HSN value of the particular node and HSN values received in Hello messages from its neighbor nodes. The default value of the CSMAS time is one (1) (e.g., when no actual time slots are allocated in the TDMA portion of the frame, a new CSMA transmission (or "CSMA portion" of the frame) can start at time slot 1 right after Hello time slot). The value of the CSMAS time is greater than or equal to the value of the SRS time.

At step 670, each node can then use the SRS time and the CSMAS time to determine the virtual, dynamic boundary between the TDMA portion of the frame and the CSMA portion of the frame. The variables, and hence the virtual CSMA or contention access boundary, dynamically change as time slots are allocated for contention-free TDMA transmission. Each node calculates and keeps a record of its CSMAS time such that it does not interfere with data transmissions on TDMA time slots. This is done in a distributive manner. In one implementation, each node can use the SRS time and the CSMAS time to calculate a dynamically adjustable ratio of the TDMA portion 351 of the frame 350 and the CSMA portion 358 of the frame 350. As such, this ratio can be viewed as an adjustable "virtual" boundary between the TDMA portion 351 of the frame 350 and the CSMA portion 358 of the frame 350. Dynamic CSMA boundary adjustment helps non-interfered nodes to identify and use free virtual time slots in CSMA portion of frame.

Figure 7:
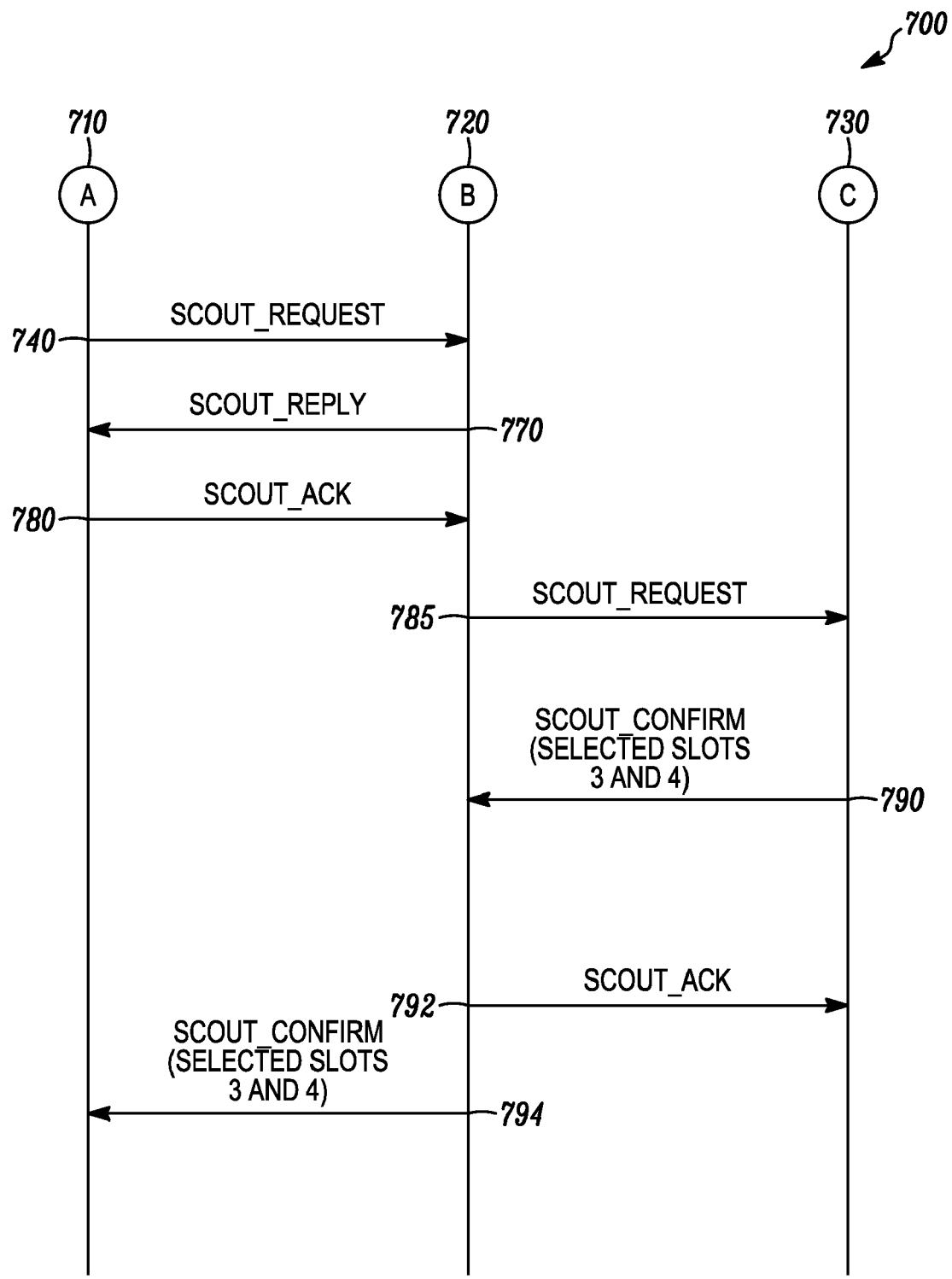
FIG. 7 is a message flow diagram illustrating a scout message exchange during a slot allocation process in accordance with some embodiments of the invention.

FIG. 7 is a message flow diagram illustrating a scout message exchange during a slot allocation process 700 in accordance with some embodiments of the invention. A three-way message exchange is shown for slot allocation in which nodes A 710, B 720 and C 730 are allocating time slots in the TDMA portion 351 of the frame 350 for contention free (TDMA) communication.

In this embodiment, scouting messages can be exchanged by the nodes along the path between a source node A 710 and a destination node C 730 as described in using techniques such as those described in U.S. patent application Ser. No. 11/420,424, filed May 25, 2006 and entitled "Systems, Methods And Apparatus For Allocating Time Slots In An Ad Hoc Wireless Communication Network," which is incorporated by reference herein in its entirety. In this scenario, scout messages can be exchanged to allocate time slots between source node A 710 and destination node C 730 through intermediate node B 720. In this particular example, time slots 1 and 2 are reserved for communication between nodes A-B 710, 720, while time slots 3 and 4 are reserved for communication between nodes B-C 720, 730. After actual timeslots 1-4 are allocated to nodes 710-730, this time slot allocation will reduce the contention or CSMA portion 358 of the frame 350 such that contention access (CSMA) in A, B, C and their neighboring nodes will start after time slot 4. Hence the virtual boundary between the TDMA portion 351 of the frame 350 and the CSMA portion 358 of the frame 350 dynamically changes.

Scout Request

The source node A 710 initiates time slot allocation process 700 as shown in FIG. 7 by sending a Scout Request message at transmission 740 to the next hop node B 720 towards the destination (as per routing table) when a data packet is received at a source node from application layer and there is no "Data Slot Allocated" for this stream number in the Slot Allocation Table (SAT).

Generating Scout Request Message

When generating the Scout Request message, the source node A 710 provides the following information in Scout Request message: a unique stream number, a source MAC Address, a destination MAC Address, Transmission Possible Slot Map (TPSM i.e. slots available on this node for transmission) and Quality of Service (QoS) parameters (e.g. a minimum data rate, and a maximum delay).

Each node also maintains a Local Communication Map (LCM table) that maintains the status of each time slot from the node's point of view (for example, if this slot is being used by this node for self transmission/reception (SelfTx/SelfRx), or if this node is being used by one of the neighbor nodes for transmission/reception (NbrTx/NbrRx)). SelfTx/SelfRx/NbrTx/NbrRx values are set for time slots that are allocated for communication either by the node itself or its immediate neighbor nodes.

The information in the Scout Request message can then be modified by each intermediate node before forwarding to the next hop.

The node generating the Scout Request message can then create an entry for the stream number in the Slot Allocation Table. The "Data Slot Allocated" field will be kept invalid and will be populated upon reception of Scout Reply message.

Processing a Scout Request Message

The Scout Request message is a directed message and is processed only by the node for which it is destined; other nodes simply discard it. In one embodiment, node B 720 processes the Scout Request message. Node B 720 first compares the Transmission Possible Slot Map (TPSM) sent by the previous hop with the local Reception Possible Slot Map (RPSM) to determine if it can receive on the time slot (or slots depending on the data rate) which is/are indicated free in TPSM. If it finds common slot (or slots) in the TPSM and RPSM map, Node B 720 will then check if the QoS requirements are met for this data stream.

If the above conditions are met, node B 720, selects timeslot(s) for communication between node A 710 and node B 720 and replies with a Scout Reply message towards node A 710 as shown in transmission 770. A Scout Reply message includes a stream number and selected slots (in this case slot 1 for reception and slot 2 for transmission). The node generating the Scout Reply message adds an entry in the Slot Allocation Table for this stream number and updates SelfTx, SelfRx, NbrTx, NbrRx values for the selected slots in LCM table (in this example Node B will set SelfRx for slot 1 and SelfTx for slot 2).

Scout Ack Message

The previous hop node (in this example, node A 710), after receiving Scout Reply message, adds the slots allocated for transmission in the Slot Allocation Table (SAT) and broadcasts a Scout Acknowledgement (Scout Ack) message as shown in transmission 780. Scout Ack transmission allows neighbor nodes to update the slot status in their LCM tables. The Scout Ack message contains the slot number(s) that this node will be using for transmission (in this example, slot 1). The Scout Ack message contains a stream number field which uniquely identifies the source, destination pair traffic, and a slots allocated field which specifies the slot number(s) selected for transmission. The Scout Ack message is a broadcast message and is not forwarded further. The nodes generating and receiving Scout Ack will update their LCM tables for selected slots (here, Node A will set SelfTx for slot 1 and Node B will set NbrTx for slot 1).

This three way message exchange (Scout Request, Scout Reply and Scout Ack) completes the slot allocation between the source node A 710 and next hop node B 720. This exchange also allows the neighboring nodes to update the LCM table according to the slots selected. This three-way message exchange is repeated at all the times when slot allocation is required between two neighbor nodes. Slot allocation in one embodiment continues by forwarding the Scout Request message by node B 720 towards the destination node C 730 as shown in transmission 785. Before forwarding the Scout Request message, a number of fields are updated in the Scout Request message. For example, the intermediate node appends its modified TPSM, updates QoS related fields (e.g. data rate, delay incurred so far).

Scout Confirmation Message

When the destination node C 730 receives a Scout Request message, it perform similar checks as done for generating Scout Reply message, but instead it replies back with Scout Confirmation message. At transmission 790, the destination node C 730 sends a Scout Confirmation message which marks the completion of end-to-end allocation. Slots selected for communication between node B 720 and node C 730 are included in this Scout Confirmation message. A Scout Confirmation message is a unicast message sent by a destination node to its previous hop node if all the intermediate nodes, including the node itself, have necessary slots to meet the QoS requirement of the data stream. Node B 720 acknowledges the receipt of Scout Confirmation and announces selected slots to its neighbor nodes by broadcasting a Scout Ack message as shown in transmission 792. Node B 720 then forwards the Scout Confirmation message to the next hop towards the source node as shown in transmission 794, but without the field containing the selected slot numbers (the slot number/numbers field is used only the destination node to save one Scout Reply message). The reception of the Scout Confirmation message by source node A 710 marks the end of the slot allocation procedure for this particular stream (here, between source node A 710 and destination node C 730).

Dynamic De-Allocation

Time slots can be de-allocated or freed either through an explicit message exchange or by expiry timers. Once a call is disconnected, the source will send a "Release Slot" message to the destination on the reserved path for the call. All the nodes (intermediate and destination) receiving this message will release the slots associated with the call (identified by the stream number. Allocated slots also have an expiry timer. When a slot is used for transmission/reception, the timer is refreshed. If for some reason, a Release Slot message is not received; allocated slots can be freed when the timer expires. Allocated slots may need to be released due to route error (link breaks) or a scheduling error (when enough slots cannot be allocated for an end-to-end path).

Figure 8:
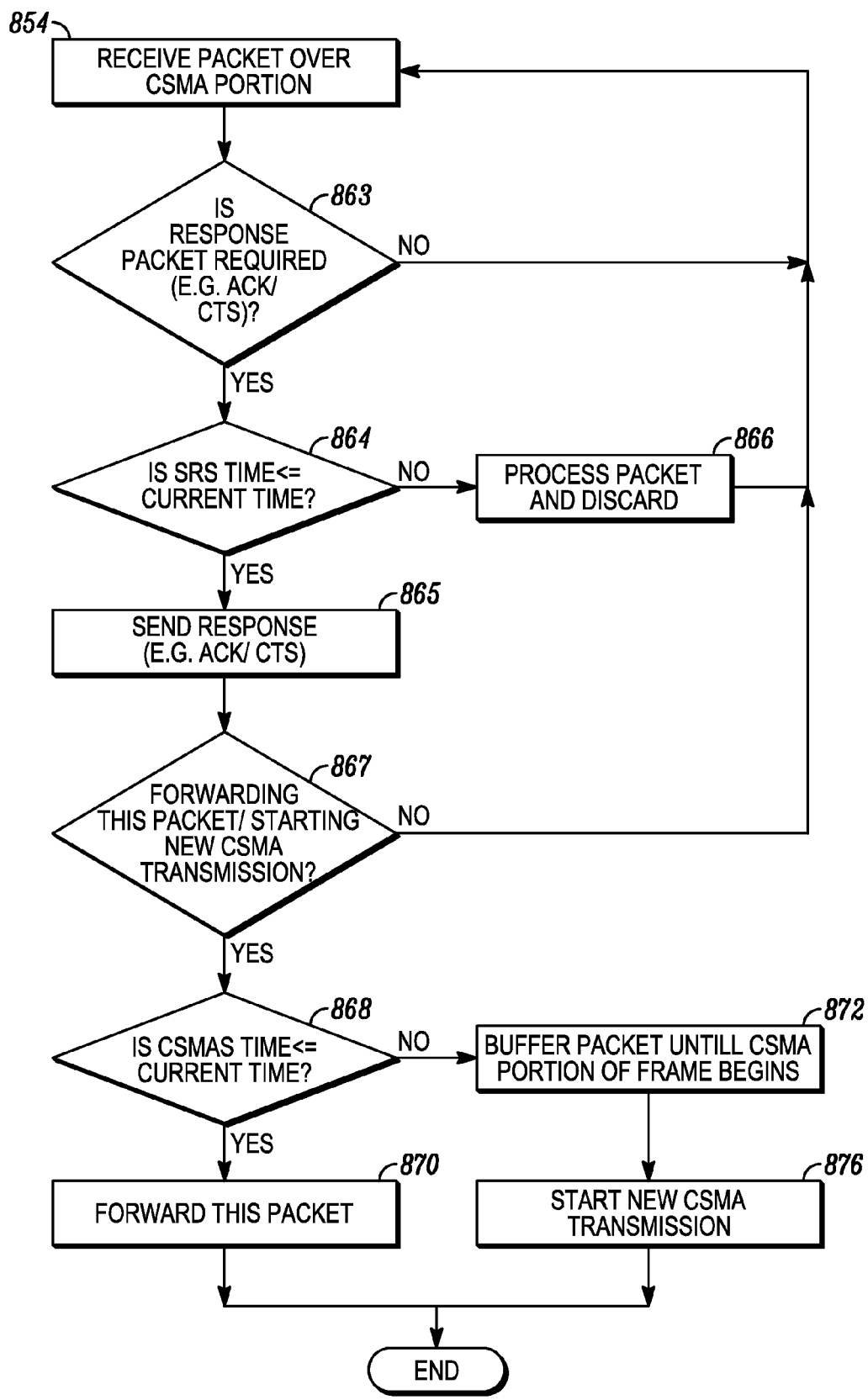
FIG. 8 is a flowchart illustrating techniques for using boundary management variables to control and manage transmission and reception of packets over a CSMA portion of a frame according to at least some embodiments of the invention.

FIG. 8 is a flowchart illustrating the steps 800 that a node uses to control and manage transmissions over a CSMA portion of the frame (i.e. steps that allow a node to determine whether to transmit a packet on a CSMA portion of the frame as time slots are allocated so that transmission in the TDMA portion of the frame does not interfere with transmissions on virtual CSMA time slots). The determination is based on the boundary management variables that are calculated as previously discussed in FIG. 6 using the information in the periodic Hello messages and the LCM table.

The process 800 starts at step 854 when a node receives a packet transmitted over the CSMA portion 351 of the frame 350.

At step 863, the node determines whether a response packet (e.g., acknowledgement (ACK) or Clear-To-Send (CTS) packet) is required in response to the packet it received at step 854. When the node determines that a response packet is not required at step 863, then the process 800 returns to step 854 where another packet is received over the CSMA portion of the frame. When the node determines that a response packet is required at step 863, then the process 800 proceeds to step 864 where the node determines if the SRS time is less than or equal to current time. When the SRS time is greater than the current time, then at step 866, the node processes the packet, discards it and does not generate response. The process 800 then returns to step 854. When the SRS time is less than or equal to the current time, then at step 865, the node sends a response packet (e.g., ACK or CTS) back to the node that sent the packet (or the reply message back to source if needed).

At step 867, the node determines whether it is either (a) forwarding this packet or (b) starting a new CSMA transmission. If not, then the process 800 then returns to step 854. However, when the node determines that it is either (a) forwarding this packet or (b) starting a new CSMA transmission, then the process proceeds to step 868 where the node determines if its CSMAS time is less than or equal to current time, and if so, at step 870, the node forwards the packet on the CSMA portion of the frame to the next hop node, and the process ends at step 880.

By contrast, when the node determines that its CSMAS time is not less than and not equal to current time (e.g., is greater than the current time), then at step 872, the node buffers the packet. The node waits until its CSMA portion of the frame starts before starting a new CSMA transmission at step 876.

Illustrative Scenario

FIGS. 9 and 11-17 are block diagrams of a communication network 1000 which illustrate the operation of the hybrid MAC and the variable values at different nodes in the communication network 1000 as a CSMA boundary is adjusted at particular nodes so that CSMA transmissions do not collide with TDMA slot transmissions. FIG. 10 is a data structure diagram showing a super frame data structure after TDMA time slots have been allocated when nodes are using both TDMA portion and CSMA portion of the frame according to one implementation. The scenario shown in FIGS. 9 and 11-17 shows how the dynamic boundary management happens in the neighborhood and how CSMA transmissions are managed to avoid interference with TDMA transmissions.

FIGS. 9 and 11-17 illustrate a scenario in which nodes in the communication network 1000 calculate variables to determine a virtual boundary within a frame. In this example scenario, source node G 1010 is communicating with destination node J 1016 over TDMA using time slots 1, 2, 3 and 4. In this example, node F 1044 wants to send a data packet to node H 1012 over a CSMA portion of the frame. Accordingly, in the description that follows, variable computations are described at the specific nodes along the path between node F 1044 and node H 1012. As such, the calculation of boundary management variables will be described only with reference to certain nodes 1020-1044 to illustrate computations which would take place and during CSMA communication between node F 1044 and node H 1012 (in presence of TDMA communication between node G 1010 and node J 1016).

In the scenario shown in FIGS. 9 and 11-17, the network 1000 comprises nodes A through T and V-Y, and it is assumed that diagonal nodes are not neighbor nodes of one another (e.g., are not within transmission range of each other so they cannot hear each other). For instance, the neighbor nodes of node H 1012 would be node G 1010, node C 1004, node I 1014 and node M 1020.

Figure 9:
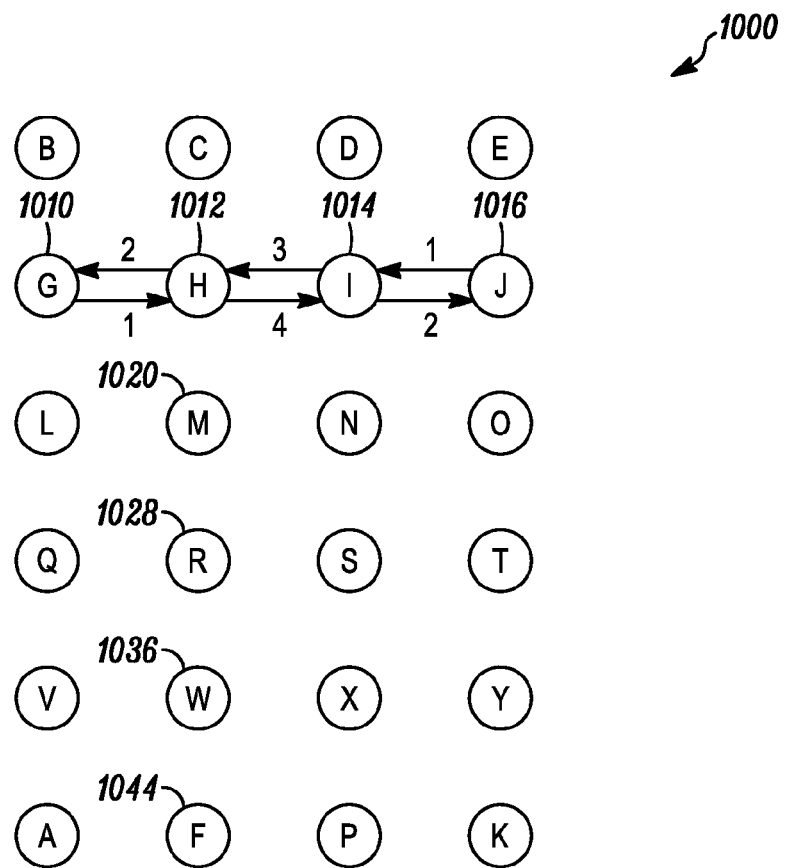
FIG. 9 is a block diagram of a communication network.
Figure 10:
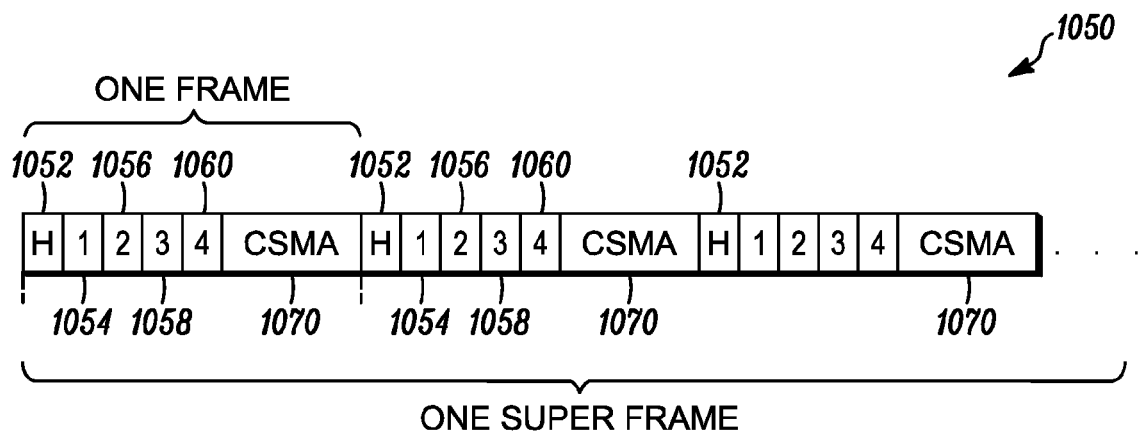
FIG. 10 is a data structure diagram illustrating a super frame data structure after actual TDMA time slots have been allocated when nodes are using both TDMA portion and CSMA portion of the frame according to one implementation.

FIG. 9 shows time slot allocations for the communication stream between source node G 1010 and destination node J 1016. For example, time slot 1 is allocated to node G 1010 for its communications to node H 1012, time slot 2 is allocated to node H 1012 for its communications to node G 1010, time slot 4 is allocated to node H 1012 for its communications to node I 1014, time slot 3 is allocated to node I 1014 for its communications to node H 1012, time slot 2 is allocated to node I 1014 for its communications to node J 1016, and time slot 1 is allocated to node J 1016 for its communications to node I 1014. It will be appreciated that the slot allocation algorithm being used in this network 1000 works with the LCM table to limit the slot reservation to two hops to maximize spatial re-use of time slots by two-hop neighbor nodes (e.g., time slot 1 is allocated to both node G 1010 and node J 1016, and time slot 2 is allocated to both node H 1012 and node I 1014).

FIG. 10 is a data structure diagram illustrating a super frame data structure 1050 after TDMA time slots have been allocated in the example shown in FIG. 9. In this example, each frame in the super frame comprises a Hello time slot (H) 1052, actual time slot 1 1054, actual time slot 2 1056, actual time slot 3 1058, actual time slot 4 1060, and a CSMA portion 1070.

Given these time slot allocations, the CSMA boundary needs to be adjusted at each of the nodes so that CSMA transmissions do not collide with TDMA slot transmissions. To dynamically adjust the CSMA boundary, boundary management variable values are determined at each node in the communication path. Each node can run a boundary management algorithm to determine the CSMA boundary.

Figure 11:
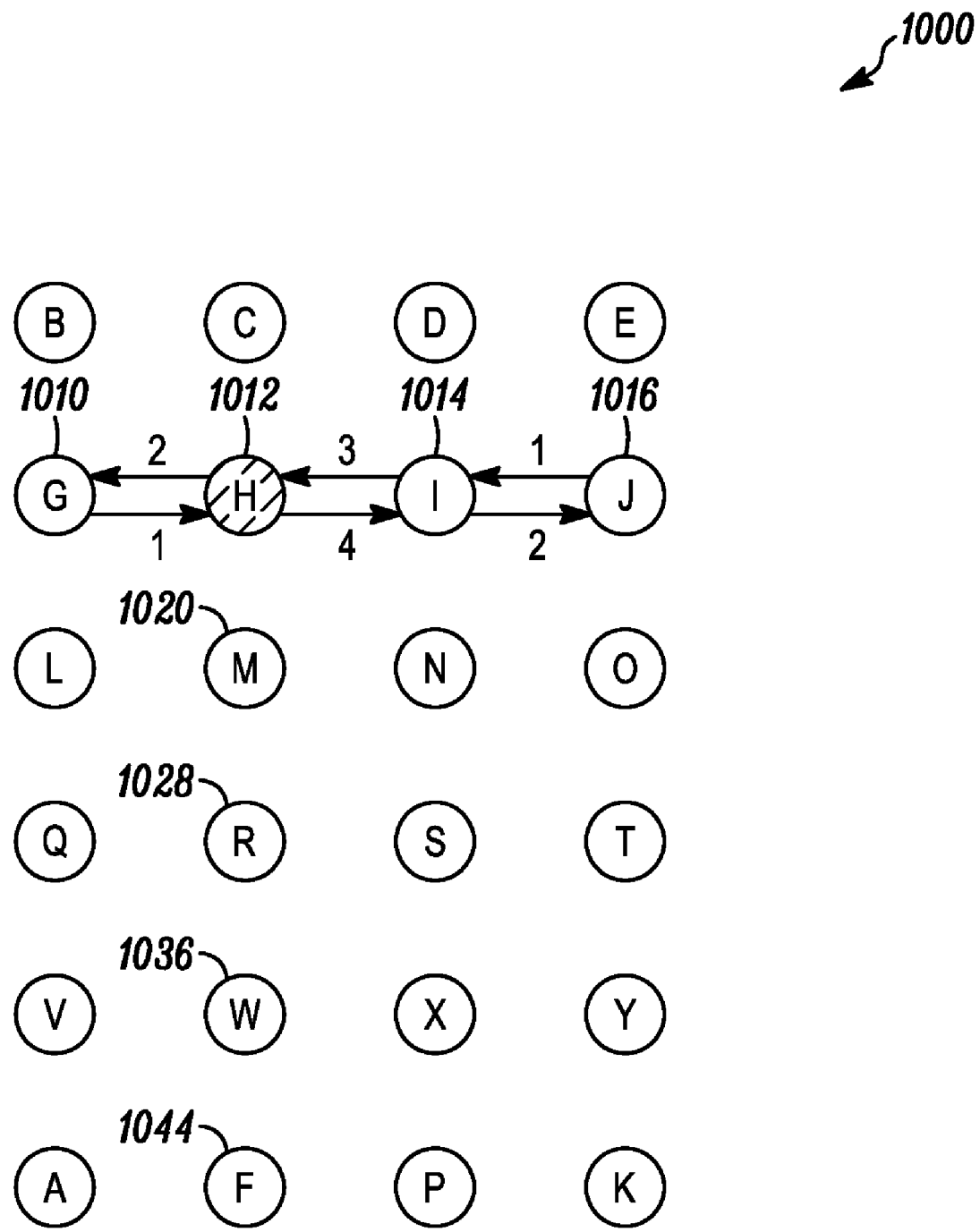
FIGS. 11-17 are block diagrams of the communication network in FIG. 9 showing a scenario in which nodes in the communication network calculate variables to determine a virtual TDMA-CSMA boundary within a frame.

Referring now to FIG. 11, a virtual boundary management algorithm running at Node H 1012 determines that the variable values at Node H 1012 are: self-HSN is equal to 4 (e.g., SelfTx field is set for time slot 4 of the LCM table), SRS time is equal to 5 (e.g., self-HSN+1), and the CSMAS time is equal to 5 (nbrhood-HSN+1). Node H 1012 sets a value of self-HSN equal to 4 in the "Highest Slot Number" field of its Hello message, and then sends out its Hello message.

Figure 12:
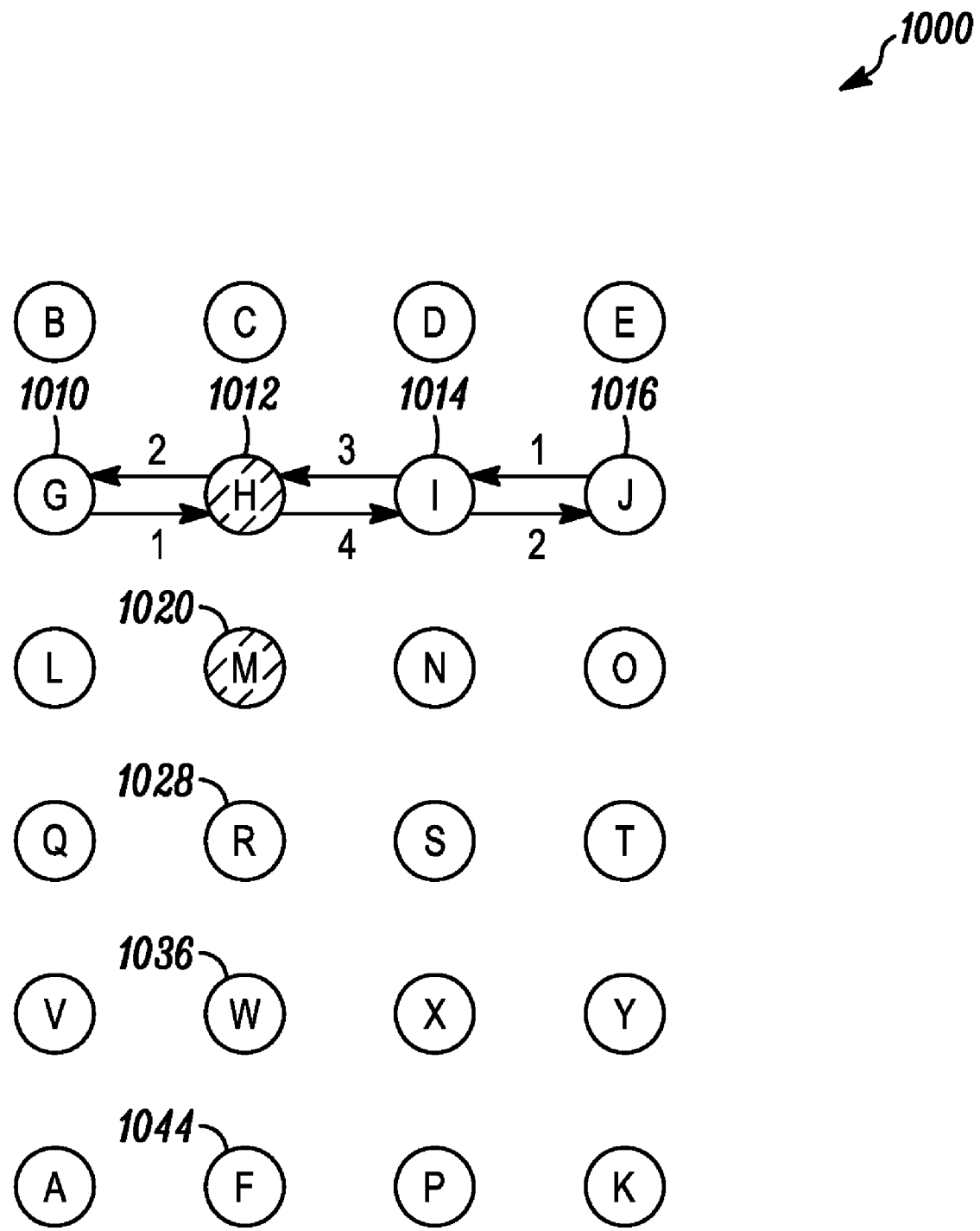

Referring now to FIG. 12, Node M 1020 receives the Hello message from Node H 1012, and the boundary management algorithm running at Node M 1020 determines that the variable values at Node M 1020 are: self-HSN is equal to 4 (e.g., NbrTx is set for time slot 4 in LCM table), SRS time is equal to 5 (e.g., self-HSN plus 1), and the CSMAS time is equal to 5 (e.g., "the Highest Slot Number received in the Hello message sent by node H 1012" plus 1). Node M 1020 sets a value of self-HSN equal to 4 in the "Highest Slot Number" field of its Hello message, and then sends out its Hello message.

Figure 13:
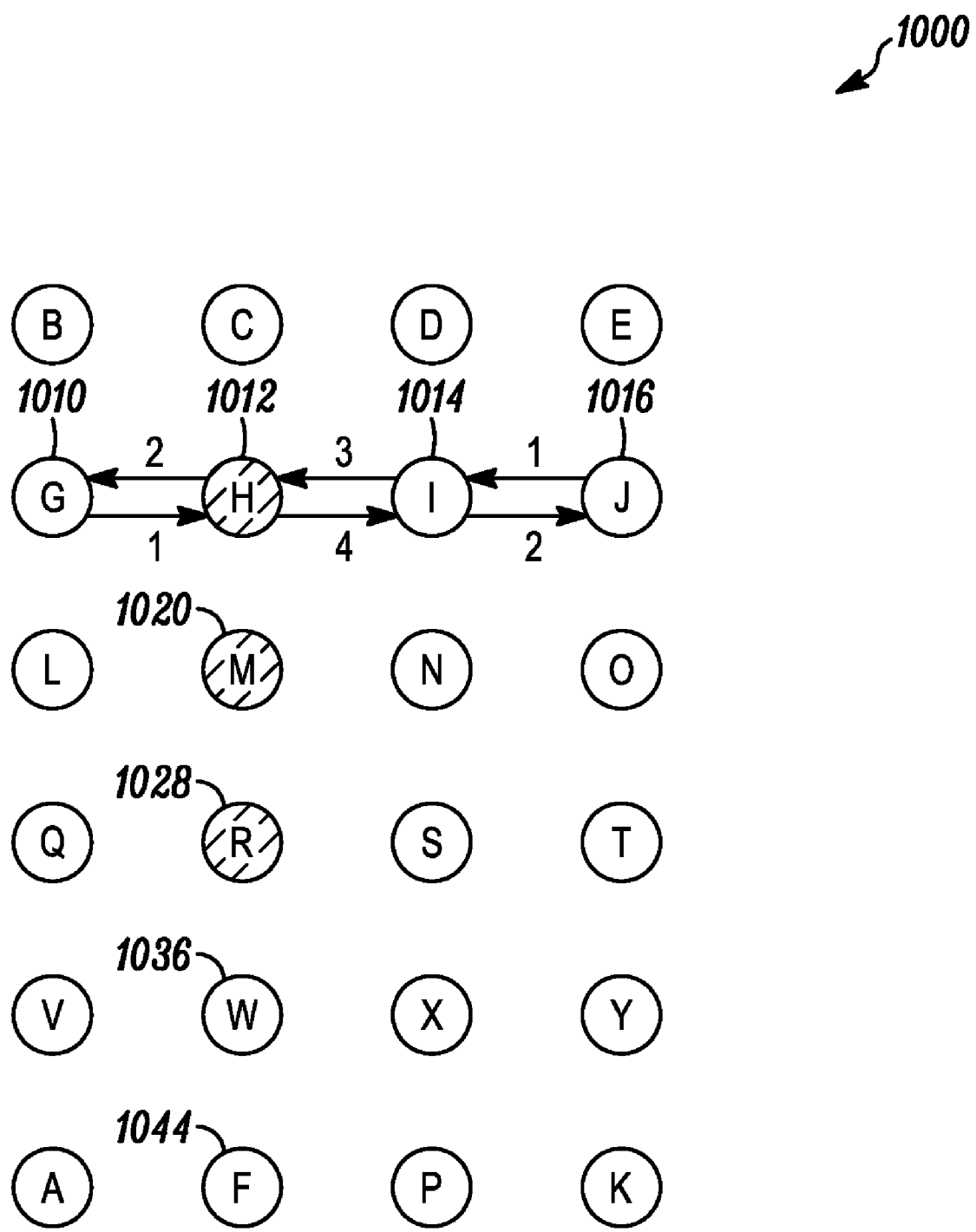

Referring now to FIG. 13, Node R 1028 receives the Hello message from Node M 1020, and the boundary management algorithm running at Node R 1028 determines that the variable values at Node R 1028 are: self-HSN is equal to 0 (e.g., no entry in LCM as neither this node nor its neighbors are using any slots for TDMA communication), SRS time is equal to or "default value" 1 (e.g., self-HSN plus 1), and the CSMAS time is equal to 5 (e.g., "the Highest Slot Number received in the Hello message sent by Node M 1020"+1). Node R 1028 sets a value of self-HSN equal to 0 in the Highest Slot field of its Hello message, and then sends out its Hello message.

Figure 14:
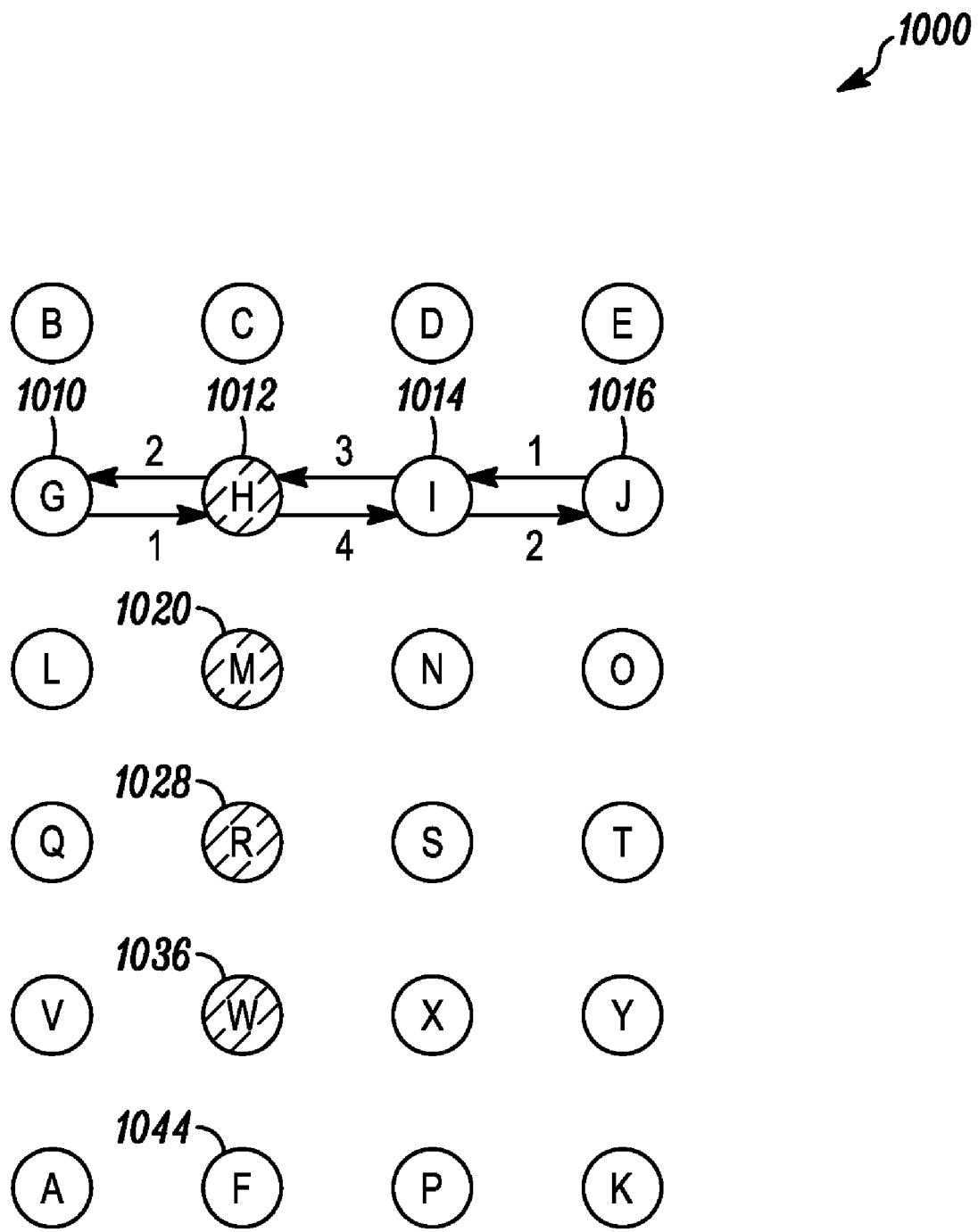
Figure 15:
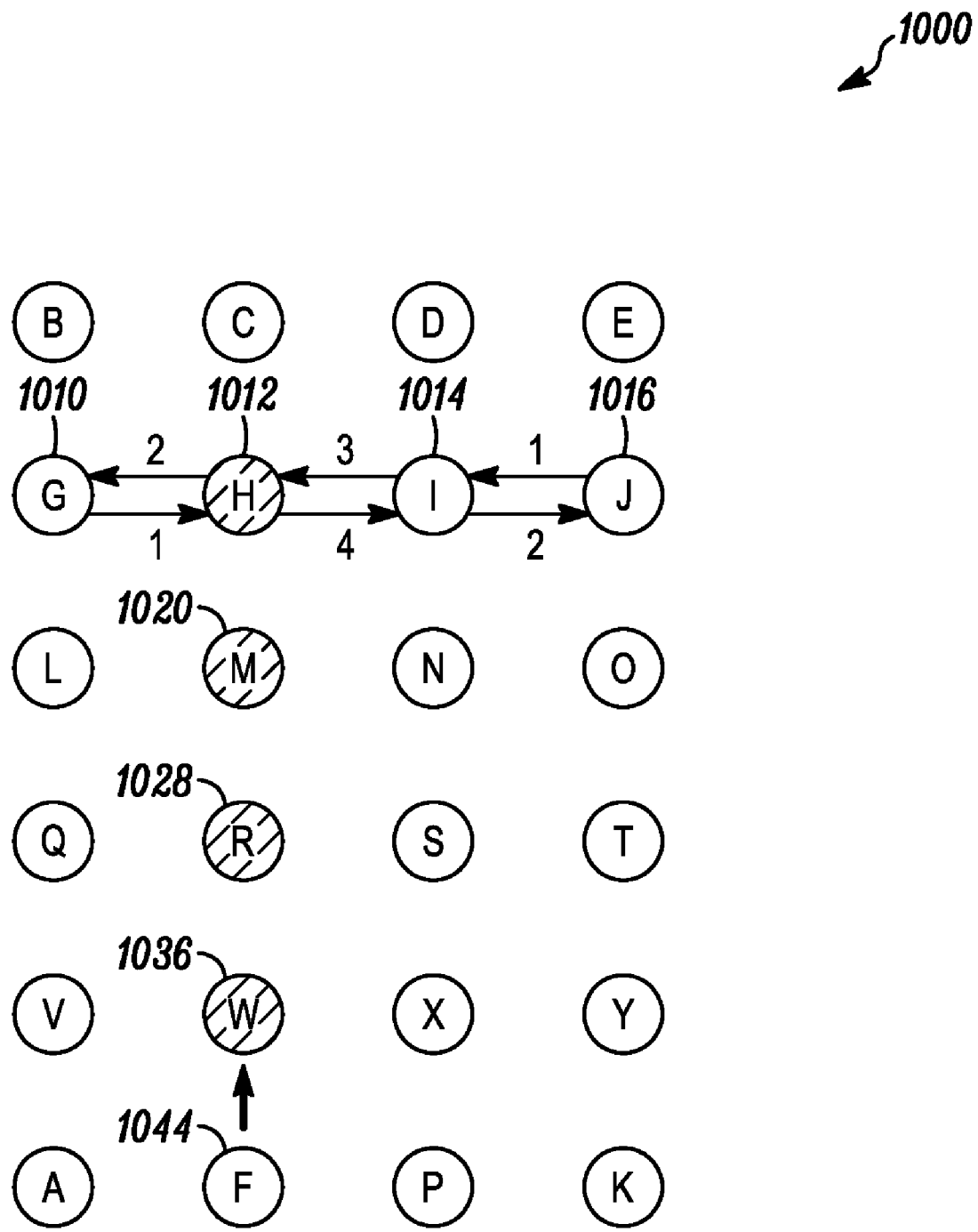

Referring now to FIG. 14, Node W 1036 receives the Hello message from Node R 1028, and the boundary management algorithm running at Node W 1036 determines that the variable values at Node W 1036 are: self-HSN is equal to 0 (e.g., no entry in LCM), SRS time is equal to "default value" 1 (e.g., self-HSN+1), and the CSMAS time is equal to default value of 1 (e.g., the Highest Slot Number received in the Hello message sent by Node R 1028+1). Node W 1036 sets a value of self-HSN equal to 0 in the Highest Slot field of its Hello message, and then sends out its Hello message.

At this point, Node H 1012, Node M 1020, Node R 1028, and Node W 1036 have computed values for each of the boundary management variable values along the path between node F 1044 and node H 1012.

Any node receiving a packet on the CSMA portion of the frame processes it as shown in FIG. 8. For example, referring to FIG. 15, node F 1044 starts its communication over CSMA towards node H 1012 by sending data packet to next hop node W 1036. Node F's CSMA starts at slot 1 (i.e. right after Hello slot). Data packet is sent during slot 1 time to next hop node W, which will receive the packet in the same time slot (i.e. slot 1) assuming the data packet is very small and fits well within 1 slot length. Then upon receiving the packet, Node W 1036 determines if SRS time, which for Node W 1036 is 1, is less than or equal to the current time, which in this case is 1. The current time is 1 because the node F 1044 will start its CSMA transmission right after the Hello slot (so it can be assumed that the current time is at virtual slot 1 when node W 1036 receives the packet over CSMA from node F 1044. Here time values are represented as slot numbers (e.g., when current time is slot 1, this means it is the clock time when the slot 1 starts).

Since the SRS time (which in this case is 1) is equal to the current time (which in this case is 1), Node W 1036 sends an ACK back to Node F 1044. Next, node W 1036 needs to determine if it can forward this received data packet to the next hop by starting its own CSMA transmission (i.e. if it its CSMA portion of the frame has started yet). Node W 1036 determines if CSMAS time, which for Node W 1036 is 1, is less than or equal to the current time, which in this case is 1. Since Node W 1036 determines that the CSMAS time, which for Node W 1036 is 1, is less than or equal to the current time, which in this case is 1, and Node W 1036 forwards (starts its own new CSMA transmission) the packet on its CSMA portion of the frame to the next hop node R 1028 toward the destination (which in this example is Node H 1012).

Figure 16:
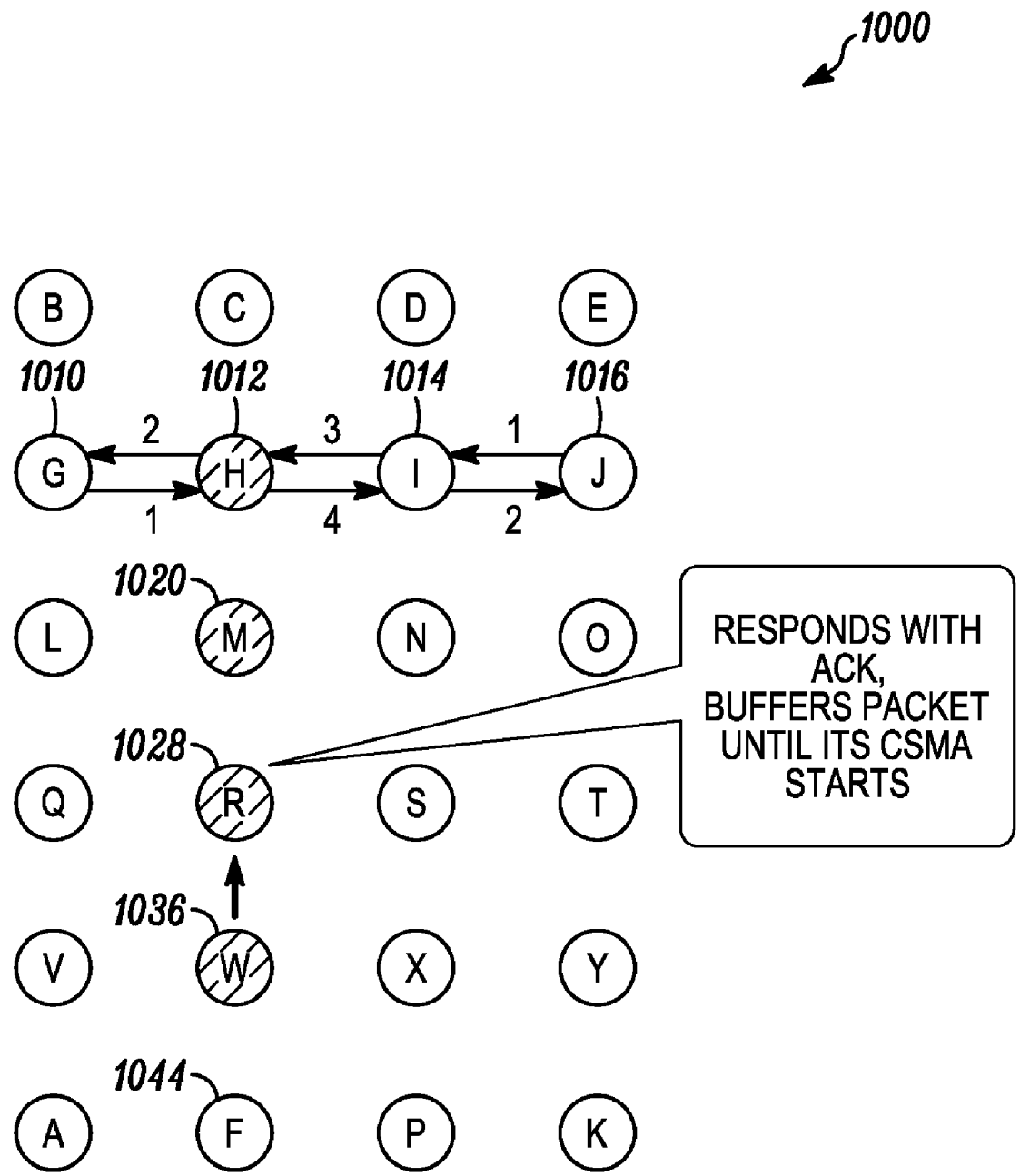
Figure 17:
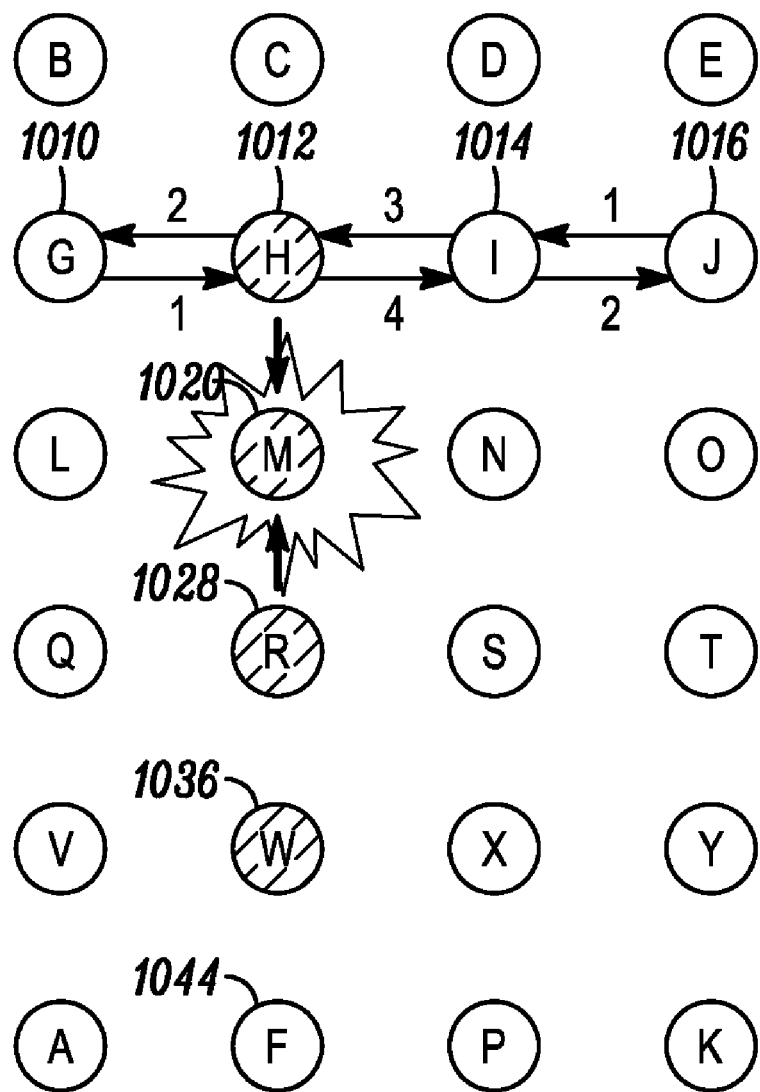

Referring now to FIG. 16, upon receiving the data packet forwarded by node W 1036, Node R 1028 determines if SRS time is less than or equal to current time (i.e. if it can respond with an ACK for the received data packet). In this case, the SRS time of 1 is equal to current time of 1, and therefore, Node R 1028 sends ACK back to Node W 1036 in order to notify correct reception of the packet. Next, Node R 1028 determines if it's CSMAS time is less than or equal to current time (i.e. if it can forward this data packet to next hop node towards the destination). In this case, the CSMAS time of slot 5 is greater than (e.g., not less than and not equal to) the current time of 1, and therefore, Node R 1028 buffers the packet and waits until its CSMA portion of the frame starts at time slot 5 before starting a new CSMA transmission. This way the probability of packet being sent on CSMA at the same time as TDMA slot being used in the neighborhood is avoided and each node maintains the dynamic CSMA boundary information. For instance, in this example, if Node R 1028 did not maintain the correct CSMA boundary information (i.e. correct CMSAS time value), it will not buffer the packet and forwarded the packet to Node M 1020. then the packet could reach Node M 1020, for instance, at time of slot 2. Unfortunately, Node H 1012 may be sending a packet to Node G 1010 on time slot 2 (referring to FIG. 17), and therefore the packets will collide at Node M 1020.

By regularly updating the dynamic boundary management variables in a distributive manner, the effect of TDMA slot reservation on a CSMA portion of the frame is limited to maximum two hops to maximize the spatial re-use. Boundary management variables avoid the interference between TDMA and CSMA transmissions and provide an efficient use of TDMA and CSMA portions of the frame.

Thus, as can be appreciated from the description provided above, a framework is provided for a hybrid TDMA-CSMA MAC which uses best features of TDMA and CSMA. The hybrid TDMA-CSMA MAC protocol is provided for allocating time slots within a frame transmitted/received in a multihop ad hoc network comprising a plurality of nodes.

The frame structure used in conjunction with the hybrid MAC can include both TDMA and CSMA portions depending on traffic pattern. Each frame has a structure in which transmission time is divided into a TDMA portion including a first number of actual TDMA time slots and a CSMA portion including a second number of "virtual" time slots. Each of the nodes can transmit a Hello message which includes a Highest Slot Number (HSN) field which indicates a highest slot number being used by the node or being used by a neighbor node of the node. At a given node, each time one of the Hello messages is received from a neighbor node, the given node can calculate or update the boundary management variables based on the HSN field, and these variables can then be used by the given node to calculate a ratio of the first number to the second number (e.g., number of actual time slots in a frame which are allocated for a TDMA portion of the frame versus a number of "virtual" time slots in the frame which are allocated for a CSMA portion of the frame). As a result, the relative percentages of the frame which are allocated for the TDMA portion and the CSMA portion can be expressed as the ratio of the first number to the second number, and this ratio can be dynamically adjusted depending upon the traffic conditions or pattern observed by nodes within the multi-hop ad hoc network at any particular time.

This can allow time sensitive periodic traffic to be communicated using non-contented reserved slots, while non-periodic bursty traffic can be sent using contention access transmissions. Dynamically splitting a frame into TDMA and CSMA can help to maximize resource utilization and solve the problems faced in pure CSMA or TDMA systems.

Figure 18:
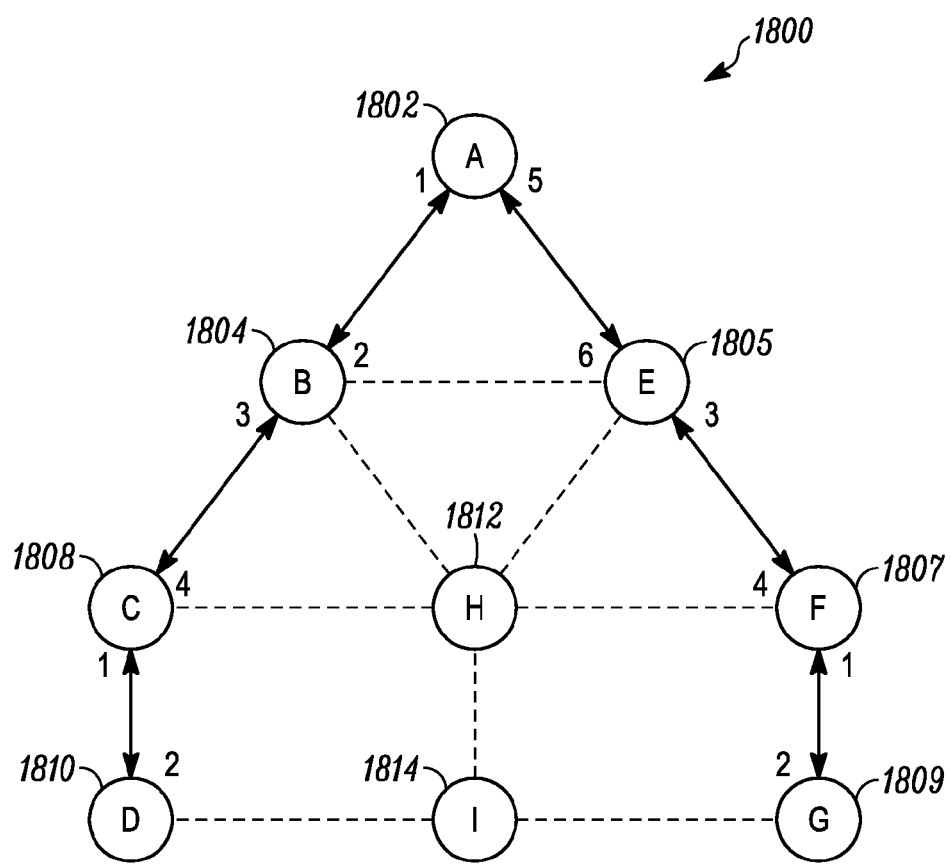
FIG. 18 is a block diagram of a communication network in one scenario when six TDMA time slots have been allocated to node A for contention free communication with node D and node G.

FIG. 18 is a block diagram of a communication network 1800 in one scenario when six TDMA time slots have been allocated to support contention free communication from node A 1802 to nodes D 1810 and node G 1809 where TDMA slot allocation is shown to support two concurrent communication streams between nodes A-D and A-G. A total of six TDMA time slots are being used in the neighborhood of node A 1802. In other words, the scenario in FIG. 18 shows two TDMA communications, one communication between node A 1802 and node D 1810 and another communication between node G 1809 and node A 1802. In FIG. 18, the dotted lines represent the communication range, whereas each double-headed arrow represents a TDMA slot allocation for two way traffic.

In this scenario, TDMA time slots 1, 2 have been allocated for communications between node A 1802 and node B 1804, TDMA time slots 3, 4 have been allocated for communications between node B 1804 and node C 1808, and TDMA time slots 1, 2 have been allocated for communications between node C 1808 and node D 1810. Similarly, TDMA time slots 5, 6 have been allocated for communications between node A 1802 and node E 1805, TDMA time slots 3, 4 have been allocated for communications between node E 1804 and node F 1807, and TDMA time slots 1, 2 have been allocated for communications between node F 1807 and node G 1809. Thus, because TDMA time slot 6 is the highest slot number used in the neighborhood of node A in this scenario, the CSMA start boundary will be after TDMA time slot 6 for nodes in two-hop neighborhood of node A. The resultant frame structure 2000 for node A 1802 is shown in FIG. 19.

FIG. 19 is a data structure diagram illustrating one frame 2000 of a super frame data structure for node A 1802 according to the scenario illustrated in FIG. 20. As described above, in the hybrid MAC, a frame 2000 includes both a TDMA period or portion 2003-2008 which can be used for communicating periodic data information, such as voice/video traffic, and a CSMA period or portion 2020 which can be used for communicating non-periodic or bursty data and control information, such as ftp or http traffic, routing and MAC control packets. When voice/video traffic is detected, TDMA time slots are assigned for contention free transmission and the TDMA portion 2003-2008 of the frame 2000 grows dynamically as the periodic voice/video traffic increases in the network. Here, four TDMA time slots (slot 1, 2, 5 and 6) have been allocated to node A 1802 for self transmit and receive in order to support two periodic voice/video traffic and the remainder of the frame 2000 makes up the CSMA portion 2020. FIG. 19 shows the state of time slots 2003-2008 in the frame structure 2000 of node A.

As the number of TDMA time slots which are assigned for contention free transmission dynamically changes, this in turn dynamically changes the CSMA boundary. As described above, neighbor nodes synchronize their CSMA Start time (CSMAS), and the highest slot number (HSN) used in the neighborhood serves as the starting point for the contention based CSMA portion 2020 of the frame 2000.

FIG. 20 is a table which illustrates values of hybrid MAC variables at each node A-J 1802-1814 in the scenario illustrated in the communication network 1800 of FIG. 18. In this table, column one includes the particular node, column 2 includes the highest slot number (HSN) at each node A-J 1802-1814, and column 3 includes CSMA start (CSMAS) time at each node A-J 1802-1814. As described above, the HSN refers to the highest slot number being used by the node itself or in its neighborhood (SelfTx, SelfRx, NbrTx, and NbrRx), whereas the CSMAS time is calculated by each node and represents the slot time at which the CSMA period of the frame starts. More detailed information regarding dynamic CSMA boundary management is provided above. As also described above, each node A-J 1802-1814 uses the HSN and CSMAS time variables to synchronize their dynamic CSMA boundary information.

FIG. 21 is a data structure diagram illustrating the structure of the frame 2000 at node A 1802 at another time according to a scenario when communication between node A 1902 and node D 1910 ends.

When the communication stream between node A 1902 and node D 1910 ends, the TDMA time slots 1, 2, 3, 4 which had been allocated to support the contention free communication stream between node A 1902 and node D 1910 are no longer needed. By contrast, for the communication stream between node A 1902 and node G 1909, the TDMA time slots 3, 4, 5, 6 have been allocated to support the contention free communication stream between node A 1902 and node G 1909 are still needed. Thus, in one scenario, two of the TDMA time slots 1, 2 (labeled with reference numerals 2003, 2004) are freed or released as illustrated in FIG. 21. In one scenario, the two TDMA time slots 2003, 2004 which have become freed (e.g., which are no longer being used when voice/video calls ends) are "intermediate" TDMA time slots within the frame 2000, while the higher numbered TDMA time slots 2005-2008 are still in use. Since the CSMA boundary depends upon the highest slot number (HSN) being used in the neighborhood, which in one scenario is TDMA time slot 6, the CSMA boundary for node A's neighborhood will not change. As such, the intermediate "freed" TDMA time slots 2003, 2004 will not be used in either in the TDMA portion or in the CSMA portion 2020 of the frame 2000, and hence bandwidth is wasted.

As will now be described with reference to FIGS. 22-25, to address such scenarios, slot position optimization techniques are provided for moving these intermediate freed TDMA time slots 2003, 2004 back into the CSMA portion 2020 of the frame 2000 and to relocate other TDMA time slots 2007, 2008 into the portion of the frame 2000 that was previously occupied by the freed TDMA time slots 2003, 2004 to thereby maximize resource utilization.

For example, by using the slot position optimization techniques described below, node A 1802 can move its used TDMA time slots 5, 6 (labeled with reference numerals 2007, 2008 in FIG. 21) to the freed TDMA time slots 1, 2 (labeled with reference numerals 2003, 2004 in FIG. 21) to thereby reduce the HSN and CSMAS time to slot 4. Accordingly, as will be illustrated in FIGS. 24 and 25, the remaining neighbor nodes 1805, 1807 in node A's neighborhood can start their CSMA period 2020 after TDMA time slot 4, thus increasing CSMA period 2020 and maximizing bandwidth utilization.

Figure 22:
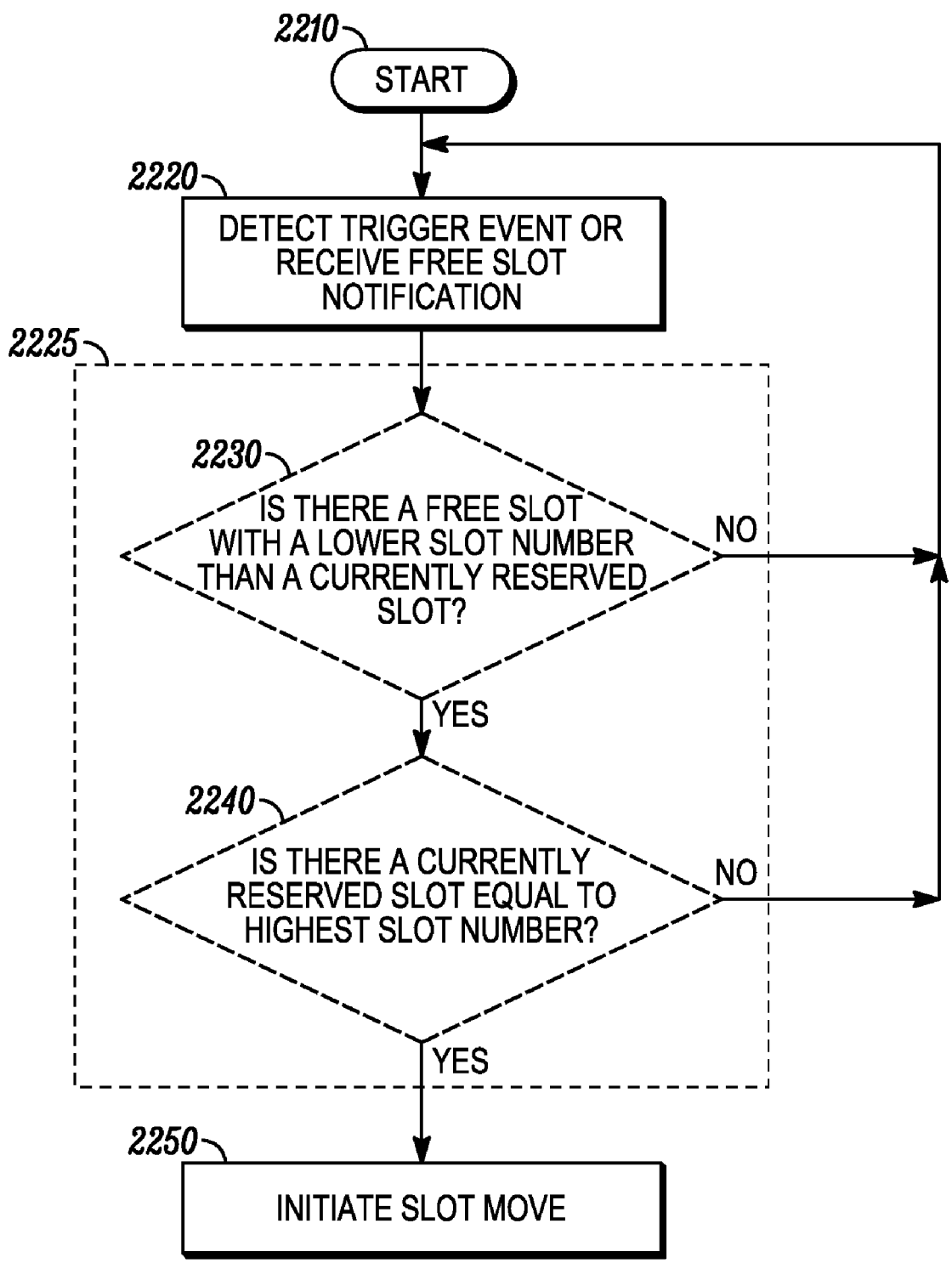
FIG. 22 is a flowchart illustrating a slot position optimization technique for determining whether to move unused TDMA time slots into a CSMA portion of the frame according to at least some embodiments of the invention.

FIG. 22 is a flowchart illustrating a slot position optimization technique 2200 for determining whether to move unused TDMA time slots 2003, 2004 into a CSMA portion 2020 of the frame 2000 according to at least some embodiments of the invention.

The process 2200 starts at step 2210, and at step 2220, a Potential Move Requestor (PMR) node can either detect a trigger event or receive a notification that a particular TDMA time slot or slots are free or currently unused.

The particular trigger event can vary depending on the particular embodiment. In one timer-based embodiment, the trigger event is the expiration of a periodic timer or decrementing counter. Nodes periodically perform slot optimization check by executing the steps 2230 and 2240 in process 2225.

The particular notification event can also vary depending on the particular embodiment. In some embodiments, a notification message is received whenever the PMR node allocates a TDMA time slot. In other embodiments, the PMR node can receive an explicit notification message (e.g., a slot free message) which indicates that a TDMA time slot has recently become free. In other embodiments, the PMR node can receive a busy slot expiry notification. In each of these embodiments, when the PMR node receives a free slot notification (e.g., when the PMR node allocates TDMA time slots or receives a notification that a TDMA time slot has become free), the process 2200 proceeds to step 2225.

At step 2225, the PMR node determines, based on the current arrangement of TDMA time slots in the frame, whether the arrangement of TDMA time slots can be optimized by moving at least one active TDMA time slot into an unused TDMA time slot to decrease the number of unused TDMA time slots and thereby improve frame utilization. In other words, the PMR node determines, based on the current arrangement of TDMA time slots in the frame, whether the unused TDMA time slots can be moved back into the CSMA portion of the frame, and other TDMA time slots can be relocated into the portion of the frame that was previously occupied by the freed TDMA time slots. One non-limiting embodiment of step 2225 is illustrated in FIG. 22 by dashed-line decision boxes 2230, 2240. In steps 2230, 2240, the PMR node checks its eligibility to initiate a slot optimization move procedure (e.g., PMR node ensures that at the PMR node is responsible for the HSN in the neighborhood, and that a slot move or "switch" by the PMR node will reduce the TDMA-CSMA boundary in the neighborhood).

At step 2230, the PMR node determines if there is at least one free TDMA time slot which has a lower slot number than a currently used TDMA time slot. If the PMR node determines that there is not at least one free TDMA time slot which has a lower slot number than a currently used TDMA time slot (e.g., the free TDMA time slot(s), if any, have a higher slot number than the current TDMA time slot used by this node), then the process 2200 loops back to step 2210. However, if the PMR node determines that there is at least one free TDMA time slot which has a lower slot number than the current TDMA time slot, used by the node then the process 2200 proceeds to step 2240. In one embodiment, the PMR node using its current used TDMA time slots for transmission looks up TPSM-RPSM or LCM table for any free TDMA time slot lower than its used TDMA time slot. For instance, in the example illustrated in FIGS. 18 and 21, if PMR node A 1802 uses its current used TDMA time slots 5, 6 for transmission looks up TPSM-RPSM or LCM table for any free TDMA time slots 1, 2 lower than its used TDMA time slots 5, 6. Because there are lower numbered free TDMA time slots 1, 2 available, the process will proceed to step 2240.

At step 2240, the PMR node determines whether one of its currently used TDMA time slots has a slot number equal to the Highest Slot Number (HSN). If the PMR node determines that none of its currently used TDMA time slots have a slot number equal to the HSN, then the process 2200 loops back to step 2210. If the PMR node determines that at least one of its currently used TDMA time slots has a slot number equal to the HSN, then the process 2200 proceeds to step 2250.

In general, step 2240 ensures that at the PMR node is responsible for HSN in the neighborhood, and that a slot move or "switch" by this PMR node will reduce the TDMA-CSMA boundary in the neighborhood. For instance, in the example illustrated in FIGS. 18 and 21, before initiating a TDMA time slot move, PMR node A 1802 first determines that its currently used TDMA time slot 6 (which has a slot number of 6) is equal to the HSN thereby ensuring that PMR node A 1802 is responsible for the HSN in the neighborhood, and that moving TDMA time slots 5, 6 to slot locations 1, 2 in FIG. 21 will therefore reduce the TDMA-CSMA boundary in the neighborhood.

At step 2250, the PMR node initiates a slot move by scheduling a Scout Request packet to be sent in CSMA period after completing its current slot transmission. During the CSMA period, this Scout Request packet will be sent with the latest TPSM map.

Figure 23:
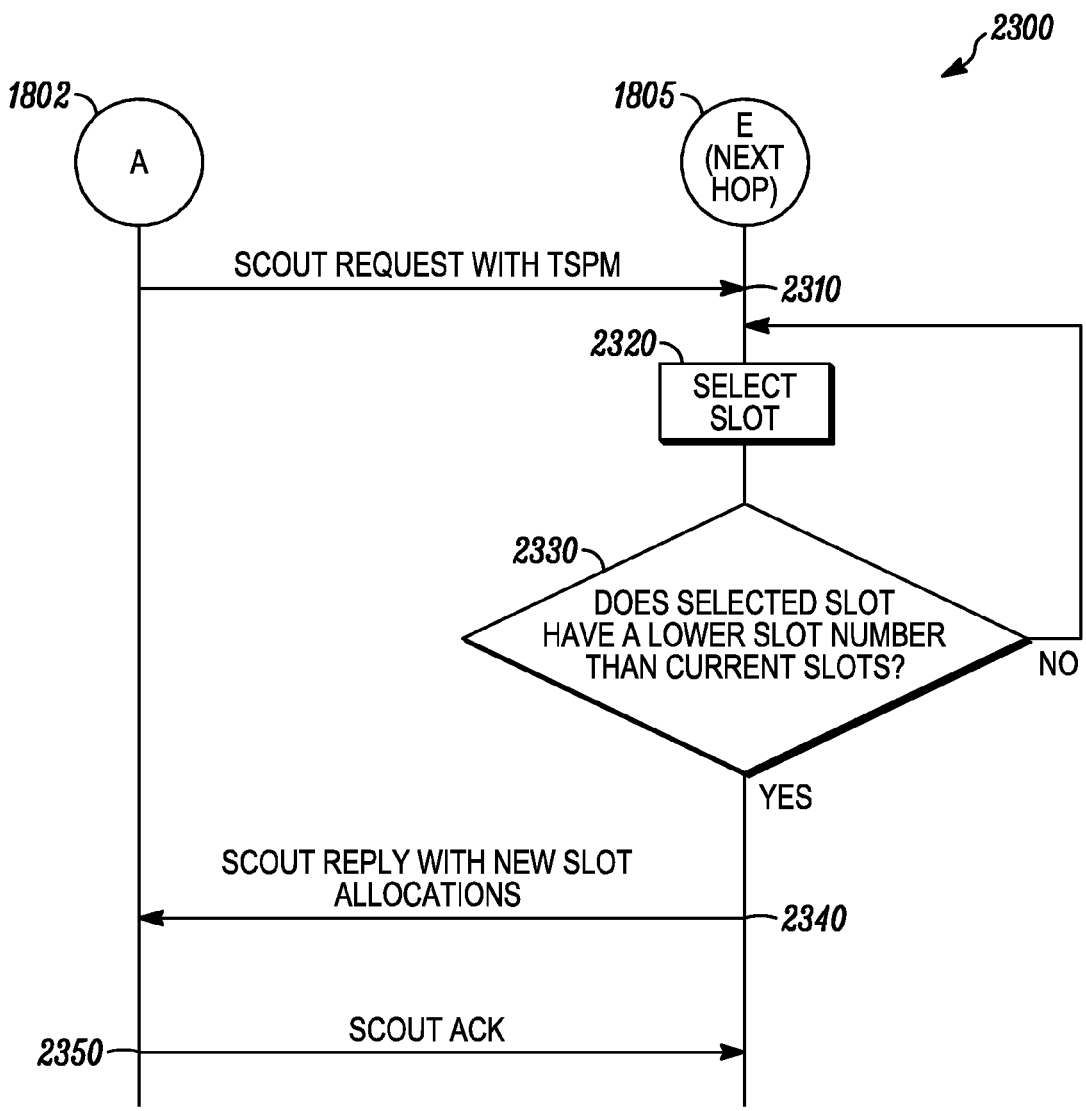
FIG. 23 is a message flow diagram illustrating a slot position movement technique for moving the unused TDMA time slots into a CSMA portion of the frame according to at least some embodiments of the invention.

FIG. 23 is a message flow diagram illustrating a slot position movement technique 2200 for moving the unused TDMA time slots 2003, 2004 into a CSMA portion 2020 of the frame 2000 according to at least some embodiments of the invention.

At step 2310, the next hop node receives the Scout Request packet from PMR node. At step 2320, the next hop node selects one of the available TDMA time slots from the latest TPSM map that is included in the Scout Request packet. At step 2330, the next hop node determines if the selected transmission possible TDMA time slot has a lower slot number than one of the TDMA time slots currently being used by the next hop node.

If newly selected TDMA time slot is a lower slot number than the currently used TDMA time slot(s), then the process 2300 proceeds to step 2340 where the next hop node replies by transmitting a Scout Reply packet with new slot allocation information to the PMR node. Optionally, the Slot Free information can be piggybacked on the Scout Reply message.

At step 2350, the PMR node receives the Scout Reply packet and transmits a Scout ACK message to the next hop node to acknowledge the TDMA time slot switch. Optionally, the Slot Free information can be piggybacked on the Scout ACK messages. Alternatively, the PMR node and the next hop node can transmit a separate, explicit Slot Free message to free the previously used slot.

Neighbor nodes will update the TDMA slot statuses upon receiving Scout Reply message, Scout ACK message and Slot Free information.

The Highest Slot Number (HSN) value will be adjusted as per new slot allocations and distributed in the neighborhood using Hello messages as described above.

Figure 24:
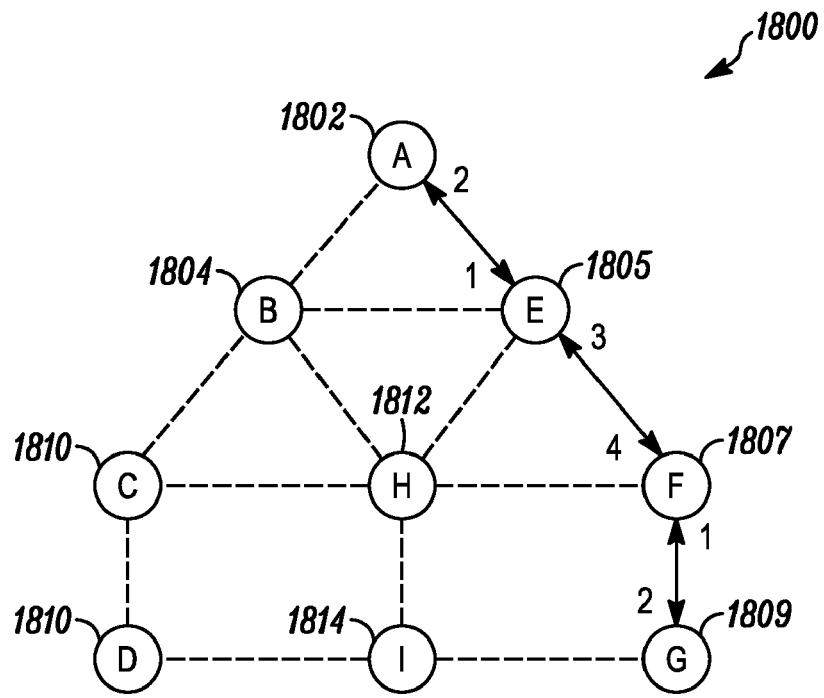
FIG. 24 is a block diagram of a communication network of FIG. 18 which shows the new TDMA time slot allocations after unused TDMA time slots have been moved into a CSMA portion of the frame according to at least some embodiments of the invention.
Figure 25:
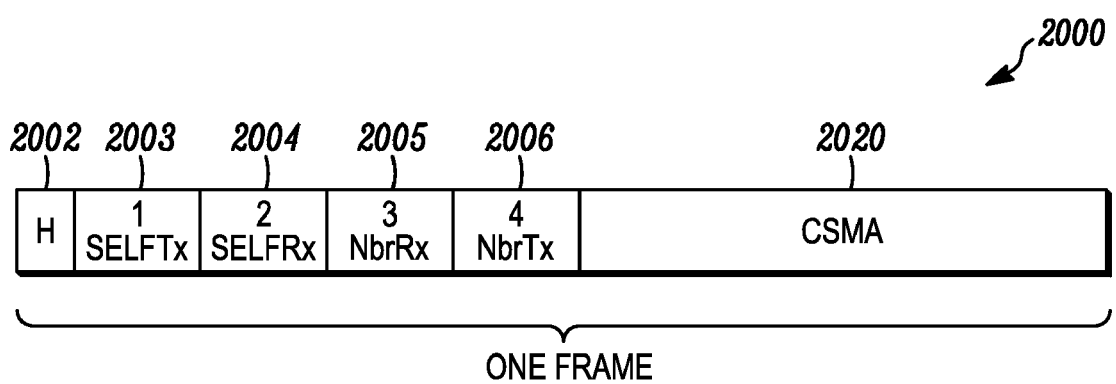
FIG. 25 is a data structure diagram illustrating the frame at node A after freed TDMA time slots have been moved into the CSMA portion of the frame and original TDMA times slots have be relocated to the freed TDMA time slots.

FIG. 24 is a block diagram of a communication network 1800 of FIG. 18 which shows the new TDMA time slot allocations being used by nodes 1802, 1805 after the two of the TDMA time slots 2003, 2004 that were no longer being used have been moved into a CSMA portion 2020 of the frame 2000 according to at least some embodiments of the invention. FIG. 25 is a data structure diagram illustrating the frame 2000 at node A 1802 after the two freed TDMA time slots (no longer illustrated) have been moved into the CSMA portion 2020 of the frame 2000 and original TDMA times slots 5, 6 have be relocated to TDMA time slots 2003, 2004.

As explained above, after the communication between node A 1802 and node D 1810 ends, node A 1802 will initiate slot move from slot 6 to slot 1 using Scout message exchange described above. This will reduce the HSN in its neighborhood to slot 5 (updated by node B 1804 and node E 1805). In the next frame, node E 1805 will perform the switch from slot 5 to slot 2 (updated by node A 1802, node B 1804, node H 1812 and node F 1807). All other nodes in two-hop neighborhood will reduce their CSMAS time as per updated value of HSN. As a result, the TDMA time slot allocations at node A 1802 will be changed after the slot move as illustrated in FIGS. 24 and 25, and the TDMA-CSMA boundary has been optimized or reduced so that there are no unused TDMA time slots thereby maximizing resource utilization.

In worst case scenario, where node performing the move has to wait one super frame to send out the new "Highest Slot Number" information in its Hello, TDMA-CSMA boundary will move by one slot in a super frame.

In best case scenario, all the slot moves will happen within one super-frame and TDMA-CSMA boundary will be adjusted to lowest possible value within a super frame.

Thus, when TDMA time slots within the frame are freed (e.g., no longer being used), the disclosed slot position optimization techniques can be used to move these freed TDMA time slots back into the CSMA portion of the frame and to relocate other TDMA time slots into the portion of the frame that was previously occupied by the freed TDMA time slots to thereby maximize resource utilization.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for optimizing bandwidth utilization in a multi-hop ad hoc network comprising a plurality of nodes which communicate using a frame comprising a plurality of time slots, wherein the frame comprises: a first number of the time slots for a Time Division Multiple Access (TDMA) portion of the frame comprising at least one or more Hello time slots; and a Carrier Sense Multiple Access (CSMA) portion of the frame comprising a second number of virtual time slots, the method comprising:
   determining a virtual boundary between the TDMA portion of the frame and the CSMA portion of the frame based on one or more boundary variables, wherein the one or more boundary variables are computed based on information contained in a hello message received in a hello time slot of the one or more hello time slots, wherein the information contained in the hello message comprises:
   one or more time slots currently being used by a node and its neighbor nodes, and
   a Highest Slot Number (HSN) field which indicates a highest slot number being used by the node or its neighbor nodes;
   determining whether the TDMA portion of the frame comprises free time slots which are no longer being used by the nodes; and
   updating the virtual boundary by decreasing the first number if the frame includes free time slots by relocating currently used time slots in the TDMA portion of the frame to the free time slots in the TDMA portion of the frame.

2. A method according to claim 1, wherein the step of decreasing the first number if the frame includes free time slots by relocating currently used time slots in the TDMA portion of the frame to the free time slots in the TDMA portion of the frame, comprises:
   decreasing the first number if the frame includes free lower-numbered time slots by relocating currently used higher-numbered time slots in the TDMA portion of the frame to the free lower-numbered time slots in the TDMA portion of the frame to reduce the neighborhood highest slot number (HSN) used in the TDMA portion of the frame thereby adding free TDMA slots to CSMA portion of the frame and increasing bandwidth utilization in the network.

3. A method according to claim 2, further comprising:
   increasing the second number of virtual time slots in the CSMA portion of the frame by reducing neighborhood HSN which moves the virtual boundary between the TDMA portion of the frame and the CSMA portion of the frame, wherein the virtual boundary comprises a ratio of a first number of actual time slots in the TDMA portion of the frame to the second number of virtual time slots of the CSMA portion of the frame.

4. A method according to claim 3, wherein the step of increasing the second number of virtual time slots in the CSMA portion of the frame comprises:
   moving a virtual boundary between the TDMA portion of the frame and the CSMA portion of the frame by increasing the second number of virtual time slots in the CSMA portion of the frame to decrease a CSMA start (CSMAS) time comprising the sum of one and a neighborhood-highest slot number to maximize bandwidth utilization in the network, wherein the CSMAS time and the virtual boundary dynamically change as the first number of time slots are allocated for transmission in the TDMA portion of the frame.

5. A method according to claim 1, wherein the free time slots were previously being used by one of the nodes, are currently located within the TDMA portion of the frame and are no longer being used by the nodes.

6. A method according to claim 5, wherein the free time slots are located between the Hello time slot and the neighborhood highest slot number (HSN) in the TDMA portion of the frame.

7. A method according to claim 1, further comprising:
   determining, at the particular node, whether the particular node is eligible to initiate a time slot move.

8. A method according to claim 7, wherein the step of determining, at the particular node, whether the particular node is eligible to initiate a time slot move comprises:
   determining, at the particular node, whether there is at least one free time slot in the TDMA portion of the frame which has a lower slot number than at least one of the time slots in the TDMA portion of the frame that is currently being used by the particular node; and
   if there is at least one free time slot in the TDMA portion of the frame which has a lower slot number than one of the time slots in the TDMA portion of the frame that is currently being used by the particular node, determining, at the particular node, whether at least one time slot in TDMA portion of the frame that is currently being used by the particular node has a slot number equal to a neighborhood Highest Slot Number (HSN), and
   wherein the step of decreasing the first number if the frame includes free time slots by relocating currently used time slots in the TDMA portion of the frame to the free time slots in the TDMA portion of the frame comprises:
   decreasing the first number if at least one time slot in TDMA portion of the frame that is currently being used by the node has a slot number equal to a neighborhood Highest Slot Number (HSN) in the TDMA portion of the frame by relocating at least one of the time slot in TDMA portion of the frame that is currently being used by the node to the free time slots in the TDMA portion of the frame.

9. A method for optimizing bandwidth utilization in a multi-hop ad hoc network comprising a plurality of nodes which communicate using a frame comprising a plurality of time slots, wherein the frame comprises: a first number of the time slots for a Time Division Multiple Access (TDMA) portion of the frame comprising at least one or more Hello time slots; and a Carrier Sense Multiple Access (CSMA) portion of the frame comprising a second number of virtual time slots, the method comprising:
   determining a virtual boundary between the TDMA portion of the frame and the CSMA portion of the frame based on one or more boundary variables, wherein the one or more boundary variables are computed based on information contained in a hello message received in a hello time slot of the one or more hello time slots, wherein the information contained in the hello message comprises:
   one or more time slots currently being used by a node and its neighbor nodes, and
   a Highest Slot Number (HSN) field which indicates a highest slot number being used by the node or its neighbor nodes;

determining whether to move at least one unused time slot in the TDMA portion of the frame into the CSMA portion of the frame; and updating the virtual boundary by moving the unused time slot from the TDMA portion of the frame into the CSMA portion of the frame, if it is determined that the unused time slot in the TDMA portion of the frame is to be moved into the CSMA portion of the frame.

10. A method according to claim 9, wherein the step of determining whether to move at least one unused time slot in the TDMA portion of the frame into the CSMA portion of the frame, comprises:

determining, based on a current arrangement of the time slots in the TDMA portion of the frame, whether to move at least one active time slot in the TDMA portion of the frame into at least one unused time slot in the TDMA portion of the frame and to move the at least one unused time slot in the TDMA portion of the frame into the CSMA portion of the frame.

11. A method according to claim 10, wherein the step of moving the unused time slot from the TDMA portion of the frame into the CSMA portion of the frame, if it is determined that the unused time slot in the TDMA portion of the frame is to be moved into the CSMA portion of the frame, comprises:

moving at least one active time slot in the TDMA portion of the frame into at least one unused time slot in the TDMA portion of the frame and moving the at least one unused time slot in the TDMA portion of the frame into the CSMA portion of the frame, if it is determined that the unused time slot in the TDMA portion of the frame is to be moved into the CSMA portion of the frame.

12. A method according to claim 11, wherein the step of determining whether to move at least one unused time slot in the TDMA portion of the frame into the CSMA portion of the frame based on a current arrangement of the time slots in the TDMA portion of the frame, comprises:

determining, based on a current arrangement of the time slots in the TDMA portion of the frame, whether to move at least one active time slot in the TDMA portion of the frame into the at least one unused time slot in the TDMA portion of the frame to increase the second number of virtual time slots in the CSMA portion of the frame and to decrease the number of unused time slots in the TDMA portion of the frame thereby improving frame utilization.

13. A method according to claim 12, wherein the step of moving the unused time slot from the TDMA portion of the frame into the CSMA portion of the frame, if it is determined that the unused time slot in the TDMA portion of the frame is to be moved into the CSMA portion of the frame, comprises:

moving at least one active time slot in the TDMA portion of the frame into the at least one unused time slot in the TDMA portion of the frame to increase the second number of virtual time slots in the CSMA portion of the frame and to decrease the number of unused time slots in the TDMA portion of the frame thereby improving frame utilization, if it is determined that the unused time slot in the TDMA portion of the frame is to be moved into the CSMA portion of the frame.

14. A method for optimizing bandwidth utilization in a multi-hop ad hoc network comprising a plurality of nodes which communicate using a frame comprising a plurality of time slots, wherein the frame comprises: a first number of the time slots for a Time Division Multiple Access (TDMA) portion of the frame comprising at least one or more Hello time slots; and a Carrier Sense Multiple Access (CSMA) portion of the frame comprising a second number of virtual time slots, the method comprising:

determining a virtual boundary between the TDMA portion of the frame and the CSMA portion of the frame based on one or more boundary variables, wherein the one or more boundary variables are computed based on information contained in a hello message received in a hello time slot of the one or more hello time slots, wherein the information contained in the hello message comprises:

one or more time slots currently being used by a node and its neighbor nodes, and a Highest Slot Number (HSN) field which indicates a highest slot number being used by the node or its neighbor nodes;

determining, at a particular node, whether the particular node is eligible to initiate a time slot move; and updating the virtual boundary by initiating the time slot move at the particular node if the particular node is eligible to initiate the time slot move.

15. A method according to claim 14, wherein the step of determining, at a particular node, whether the particular node is eligible to initiate a time slot move, comprises:

determining, at the particular node, whether there is at least one free time slot in the TDMA portion of the frame which has a lower slot number than at least one of the currently used time slot in the TDMA portion of the frame being used by the particular node;

determining, at the particular node, whether at least one time slot in TDMA portion of the frame that is currently used by the particular node has a slot number equal to a neighborhood Highest Slot Number (HSN), if the particular node determines that there is at least one free time slot in the TDMA portion of the frame which has a lower slot number than one of the currently used time slot in the TDMA portion of the frame being used by the particular node.

16. A method according to claim 15, wherein the step of initiating the time slot move at the particular node if the particular node is eligible to initiate the time slot move, comprises:

initiating the time slot move at the particular node if the particular node determines that at least one time slot in the TDMA portion of the frame that is currently used by the particular node has a slot number equal to the neighborhood Highest Slot Number (HSN).

17. A method according to claim 14, wherein the step of initiating the time slot move, comprises:

transmitting, from the particular node, a Scout Request packet comprising a current transmission possible slot map (TPSM).

18. A method according to claim 17, wherein the step of transmitting a Scout Request packet comprising a current TPSM, comprises:

scheduling, at the particular node, the Scout Request packet to be sent in the CSMA portion of the frame after the particular node completes a current transmission; and transmitting, from the particular node, the Scout Request packet during the CSMA portion of the frame, wherein the Scout Request packet comprises a current TPSM map.

19. A method according to claim 18, further comprising:

receiving, at a next hop node, the Scout Request packet from particular node and selecting, at the next hop node, a transmission possible time slot in the TDMA portion of the frame from the current TPSM map of the Scout Request packet;

determining, at the next hop node, whether the selected transmission possible time slot has a lower slot number than one of the time slots in the TDMA portion of the frame that is currently being used by the next hop node;

transmitting, from the next hop node, a Scout Reply packet comprising new slot allocation information to the particular node, if the selected transmission possible time slot has a lower slot number than one of the time slots in the TDMA portion of the frame that is currently being used by the next hop node; and receiving, at the particular node, the Scout Reply packet and transmitting a Scout ACK message to the next hop node to acknowledge the time slot switch.

20. A method according to claim 19, wherein the Scout Reply packet further comprises information which identifies freed time slots in the TDMA portion of the frame which are no longer being used by the particular node after the time slot switch.

21. A method according to claim 19, wherein the Scout ACK message comprises: information which identifies freed time slots in the TDMA portion of the frame which are no longer being used by the particular node after the time slot switch.

22. A method according to claim 14, wherein the first number of the time slots of the TDMA portion of the frame are used to transmit periodic traffic if the first number is greater than one, and wherein the second number of virtual time slots of the CSMA portion of the frame are used to transmit non-periodic traffic.

23. A method for optimizing bandwidth utilization in a multi-hop ad hoc network comprising a plurality of nodes which communicate using a frame comprising a plurality of time slots, wherein the frame comprises: a first number of the time slots for a Time Division Multiple Access (TDMA) portion of the frame comprising at least one or more Hello time slots; and a Carrier Sense Multiple Access (CSMA) portion of the frame comprising a second number of virtual time slots, the method comprising:

allocating, to each of the plurality of nodes, a hello time slot from the one or more hello time slots;

transmitting, by at least one node of the plurality of nodes, at least a highest slot number (HSN) value in the allocated hello time slot of the one or more hello time slots, wherein the at least HSN value indicates a highest slot number being used by the at least one node or a neighbor node of the at least one node;

determining, by the at least one node, a virtual boundary between the TDMA portion of the frame and the CSMA portion of the frame based on one or more boundary variables, wherein the one or more boundary variables are computed based on information contained in a hello message received in the hello time slot, wherein the information contained in the hello message comprises:

one or more time slots currently being used by a node and its neighbor nodes, and a Highest Slot Number (HSN) field which indicates a highest slot number being used by the node or its neighbor nodes;

determining whether the TDMA portion of the frame comprises free time slots which are no longer being used by the nodes; and updating the virtual boundary by decreasing the first number if the frame includes free time slots by relocating currently used time slots in the TDMA portion of the frame to the free time slots in the TDMA portion of the frame.

* * * * *